US012598261B2

(12) United States Patent
Lethem et al.

(10) Patent No.: US 12,598,261 B2
(45) Date of Patent: Apr. 7, 2026

(54) WIDEBAND DOUBLETALK DETECTION FOR OPTIMIZATION OF ACOUSTIC ECHO CANCELLATION

(71) Applicant: Shure Acquisition Holdings, Inc., Niles, IL (US)

(72) Inventors: Wesley Lethem, Chicago, IL (US); Justin Joseph Sconza, Chicago, IL (US); Christopher George Rieger, Chicago, IL (US)

(73) Assignee: SHURE ACQUISITION HOLDINGS, INC., Niles, IL (US)

( * ) Notice: Subject to any disclaimer, the term of this patent is extended or adjusted under 35 U.S.C. 154(b) by 201 days.

(21) Appl. No.: 18/477,039

(22) Filed: Sep. 28, 2023

(65) Prior Publication Data

US 2024/0106933 A1 Mar. 28, 2024

Related U.S. Application Data

(60) Provisional application No. 63/377,451, filed on Sep. 28, 2022.

(51) Int. Cl.
H04M 9/08 (2006.01)

(52) U.S. Cl.
CPC .................................... H04M 9/082 (2013.01)

(58) Field of Classification Search
CPC ........ H04M 9/082; H04M 9/08; H04M 3/002; H04M 1/20; H04M 3/568; H04M 9/085; H04M 1/58; G10L 2021/02082; G10L 21/0208; G10L 21/0232; G10L 25/78; G10L 19/008; G10L 19/0204; G10L 15/20
See application file for complete search history.

(56) References Cited

U.S. PATENT DOCUMENTS

| | | | |
|---|---|---|---|
| 1,535,408 | A | 4/1925 | Fricke |
| 1,540,788 | A | 6/1925 | Mcclure |
| 1,965,830 | A | 7/1934 | Hammer |
| 2,075,588 | A | 3/1937 | Meyers |
| 2,113,219 | A | 4/1938 | Olson |
| 2,164,655 | A | 7/1939 | Kleerup |
| D122,771 | S | 10/1940 | Doner |

(Continued)

FOREIGN PATENT DOCUMENTS

| | | |
|---|---|---|
| AU | 2004200802 | 3/2004 |
| BE | 775247 | 3/1972 |

(Continued)

OTHER PUBLICATIONS

Office Action issued for Japanese Patent Application No. 2015-023781 dated Jun. 20, 2016, 4 pp.

(Continued)

*Primary Examiner* — Akelaw Teshale

(74) *Attorney, Agent, or Firm* — Alston & Bird LLP

(57) ABSTRACT

Acoustic echo cancellation systems and methods are provided that improve the quality of the audio transmitted from by an audio device a near end to a far end when a doubletalk condition is present, including allowing certain subbands of an echo-cancelled signal to be less attenuated by overriding certain gains of subbands of the echo-cancelled audio signal in a non-linear processor, and compressing and applying makeup gain to a remote audio signal.

20 Claims, 6 Drawing Sheets

(56)                  References Cited

U.S. PATENT DOCUMENTS

| | | | |
|---|---|---|---|
| 2,233,412 A | 3/1941 | Hill | |
| 2,268,529 A | 12/1941 | Stiles | |
| 2,343,037 A | 2/1944 | Adelman | |
| 2,377,449 A | 6/1945 | Prevette | |
| 2,481,250 A | 9/1949 | Schneider | |
| 2,521,603 A | 9/1950 | Prew | |
| 2,533,565 A | 12/1950 | Eichelman | |
| 2,539,671 A | 1/1951 | Olson | |
| 2,777,232 A | 1/1957 | Kulicke | |
| 2,828,508 A | 4/1958 | Labarre | |
| 2,840,181 A | 6/1958 | Wildman | |
| 2,882,633 A | 4/1959 | Howell | |
| 2,912,605 A | 11/1959 | Tibbetts | |
| 2,938,113 A | 5/1960 | Schnell | |
| 2,950,556 A | 8/1960 | Larios | |
| 3,019,854 A | 2/1962 | Obryant | |
| 3,132,713 A | 5/1964 | Seeler | |
| 3,143,182 A | 8/1964 | Sears | |
| 3,160,225 A | 12/1964 | Sechrist | |
| 3,161,975 A | 12/1964 | Mcmillan | |
| 3,205,601 A | 9/1965 | Gawne | |
| 3,239,973 A | 3/1966 | Hannes | |
| 3,240,883 A | 3/1966 | Seeler | |
| 3,310,901 A | 3/1967 | Sarkisian | |
| 3,321,170 A | 5/1967 | Vye | |
| 3,509,290 A | 4/1970 | Mochida | |
| 3,573,399 A | 4/1971 | Schroeder | |
| 3,657,490 A | 4/1972 | Scheiber | |
| 3,696,885 A | 10/1972 | Grieg | |
| 3,699,271 A | 10/1972 | Berkley | |
| 3,755,625 A | 8/1973 | Maston | |
| 3,828,508 A | 8/1974 | Moeller | |
| 3,857,191 A | 12/1974 | Sadorus | |
| 3,895,194 A | 7/1975 | Fraim | |
| 3,906,431 A | 9/1975 | Clearwaters | |
| D237,103 S | 10/1975 | Fisher | |
| 3,936,606 A | 2/1976 | Wanke | |
| 3,938,617 A | 2/1976 | Forbes | |
| 3,941,638 A | 3/1976 | Horky | |
| 3,992,584 A | 11/1976 | Dugan | |
| 4,007,461 A | 2/1977 | Luedtke | |
| 4,008,408 A | 2/1977 | Kodama | |
| 4,029,170 A | 6/1977 | Phillips | |
| 4,032,725 A | 6/1977 | Mcgee | |
| 4,070,547 A | 1/1978 | Dellar | |
| 4,072,821 A | 2/1978 | Bauer | |
| 4,096,353 A | 6/1978 | Bauer | |
| 4,127,156 A | 11/1978 | Brandt | |
| 4,131,760 A | 12/1978 | Christensen | |
| 4,169,219 A | 9/1979 | Beard | |
| 4,184,048 A | 1/1980 | Alcaide | |
| 4,198,705 A | 4/1980 | Massa | |
| D255,234 S | 6/1980 | Wellward | |
| D256,015 S | 7/1980 | Doherty | |
| 4,212,133 A | 7/1980 | Lufkin | |
| 4,237,339 A | 12/1980 | Bunting | |
| 4,244,096 A | 1/1981 | Kashichi | |
| 4,244,906 A | 1/1981 | Heinemann | |
| 4,254,417 A | 3/1981 | Speiser | |
| 4,275,694 A | 6/1981 | Nagaishi | |
| 4,296,280 A | 10/1981 | Richie | |
| 4,305,141 A | 12/1981 | Massa | |
| 4,308,425 A | 12/1981 | Momose | |
| 4,311,874 A | 1/1982 | Wallace, Jr. | |
| 4,330,691 A | 5/1982 | Gordon | |
| 4,334,740 A | 6/1982 | Wray | |
| 4,365,449 A | 12/1982 | Liautaud | |
| 4,373,191 A | 2/1983 | Fette | |
| 4,393,631 A | 7/1983 | Krent | |
| 4,414,433 A | 11/1983 | Horie | |
| 4,429,850 A | 2/1984 | Weber | |
| 4,436,966 A | 3/1984 | Botros | |
| 4,449,238 A | 5/1984 | Lee | |
| 4,466,117 A | 8/1984 | Rudolf | |
| 4,485,484 A | 11/1984 | Flanagan | |
| 4,489,442 A | 12/1984 | Anderson | |
| 4,518,826 A | 5/1985 | Caudill | |
| 4,521,908 A | 6/1985 | Miyaji | |
| 4,566,557 A | 1/1986 | Lemaitre | |
| 4,593,404 A | 6/1986 | Bolin | |
| 4,594,478 A | 6/1986 | Gumb | |
| D285,067 S | 8/1986 | Delbuck | |
| 4,625,827 A | 12/1986 | Bartlett | |
| 4,653,102 A | 3/1987 | Hansen | |
| 4,658,425 A | 4/1987 | Julstrom | |
| 4,669,108 A | 5/1987 | Deinzer | |
| 4,675,906 A | 6/1987 | Sessler | |
| 4,693,174 A | 9/1987 | Anderson | |
| 4,696,043 A | 9/1987 | Iwahara | |
| 4,712,231 A | 12/1987 | Julstrom | |
| 4,741,038 A | 4/1988 | Elko | |
| 4,752,961 A | 6/1988 | Kahn | |
| 4,768,086 A | 8/1988 | Paist | |
| 4,805,730 A | 2/1989 | O'Neill | |
| 4,815,132 A | 3/1989 | Minami | |
| 4,860,366 A | 8/1989 | Fukushi | |
| 4,862,507 A | 8/1989 | Woodard | |
| 4,866,868 A | 9/1989 | Kass | |
| 4,881,135 A | 11/1989 | Heilweil | |
| 4,888,807 A | 12/1989 | Reichel | |
| 4,903,247 A | 2/1990 | Van Gerwen | |
| 4,923,032 A | 5/1990 | Nuernberger | |
| 4,928,312 A | 5/1990 | Hill | |
| 4,969,197 A | 11/1990 | Takaya | |
| 5,000,286 A | 3/1991 | Crawford | |
| 5,038,935 A | 8/1991 | Wenkman | |
| 5,058,170 A | 10/1991 | Kanamori | |
| 5,088,574 A | 2/1992 | Kertesz, III | |
| D324,780 S | 3/1992 | Sebesta | |
| 5,121,426 A | 6/1992 | Baumhauer | |
| D329,239 S | 9/1992 | Hahn | |
| 5,189,701 A | 2/1993 | Jain | |
| 5,204,907 A | 4/1993 | Staple | |
| 5,214,709 A | 5/1993 | Ribic | |
| 5,224,170 A | 6/1993 | Waite, Jr. | |
| D340,718 S | 10/1993 | Leger | |
| 5,289,544 A | 2/1994 | Franklin | |
| D345,346 S | 3/1994 | Alfonso | |
| D345,379 S | 3/1994 | Chan | |
| 5,297,210 A | 3/1994 | Julstrom | |
| 5,322,979 A | 6/1994 | Cassity | |
| 5,323,459 A | 6/1994 | Hirano | |
| 5,329,593 A | 7/1994 | Lazzeroni | |
| 5,335,011 A | 8/1994 | Addeo | |
| 5,353,279 A | 10/1994 | Koyama | |
| 5,359,374 A | 10/1994 | Schwartz | |
| 5,371,789 A | 12/1994 | Hirano | |
| 5,383,293 A | 1/1995 | Royal | |
| 5,384,843 A | 1/1995 | Masuda | |
| 5,396,554 A | 3/1995 | Hirano | |
| 5,400,413 A | 3/1995 | Kindel | |
| D363,045 S | 10/1995 | Phillips | |
| 5,463,618 A * | 10/1995 | Furukawa | H04M 9/082 |
| | | | 370/290 |
| 5,473,701 A | 12/1995 | Cezanne | |
| 5,509,634 A | 4/1996 | Gebka | |
| 5,513,265 A | 4/1996 | Hirano | |
| 5,525,765 A | 6/1996 | Freiheit | |
| 5,550,924 A | 8/1996 | Helf | |
| 5,550,925 A | 8/1996 | Hori | |
| 5,555,447 A | 9/1996 | Kotzin | |
| 5,574,793 A | 11/1996 | Hirschhorn | |
| 5,602,962 A | 2/1997 | Kellermann | |
| 5,612,929 A | 3/1997 | Lopes | |
| 5,633,936 A | 5/1997 | Oh | |
| 5,645,257 A | 7/1997 | Ward | |
| D382,118 S | 8/1997 | Ferrero | |
| 5,657,393 A | 8/1997 | Crow | |
| 5,661,813 A | 8/1997 | Shimauchi | |
| 5,673,327 A | 9/1997 | Julstrom | |
| 5,687,229 A | 11/1997 | Sih | |
| 5,706,344 A | 1/1998 | Finn | |
| 5,715,319 A | 2/1998 | Chu | |
| 5,717,171 A | 2/1998 | Miller | |

(56) References Cited

U.S. PATENT DOCUMENTS

| | | | |
|---|---|---|---|
| D392,977 S | 3/1998 | Kim |
| D394,061 S | 5/1998 | Fink |
| 5,761,318 A | 6/1998 | Shimauchi |
| 5,766,702 A | 6/1998 | Lin |
| 5,787,183 A | 7/1998 | Chu |
| 5,796,819 A | 8/1998 | Romesburg |
| 5,848,146 A | 12/1998 | Slattery |
| 5,870,482 A | 2/1999 | Loeppert |
| 5,878,147 A | 3/1999 | Killion |
| 5,888,412 A | 3/1999 | Sooriakumar |
| 5,888,439 A | 3/1999 | Miller |
| D416,315 S | 11/1999 | Nanjo |
| 5,978,211 A | 11/1999 | Hong |
| 5,991,277 A | 11/1999 | Maeng |
| 6,035,962 A | 3/2000 | Lin |
| 6,039,457 A | 3/2000 | O'Neal |
| 6,041,127 A | 3/2000 | Elko |
| 6,049,607 A | 4/2000 | Marash |
| D424,538 S | 5/2000 | Hayashi |
| 6,069,961 A | 5/2000 | Nakazawa |
| 6,125,179 A | 9/2000 | Wu |
| D432,518 S | 10/2000 | Muto |
| 6,128,395 A | 10/2000 | De Vries |
| 6,137,887 A | 10/2000 | Anderson |
| 6,144,746 A | 11/2000 | Azima |
| 6,151,399 A | 11/2000 | Killion |
| 6,173,059 B1 | 1/2001 | Huang |
| 6,198,831 B1 | 3/2001 | Azima |
| 6,205,224 B1 | 3/2001 | Underbrink |
| 6,215,881 B1 | 4/2001 | Azima |
| 6,266,427 B1 | 7/2001 | Mathur |
| 6,285,770 B1 | 9/2001 | Azima |
| 6,301,357 B1 | 10/2001 | Romesburg |
| 6,329,908 B1 | 12/2001 | Frecska |
| 6,332,029 B1 | 12/2001 | Azima |
| D453,016 S | 1/2002 | Nevill |
| 6,386,315 B1 | 5/2002 | Roy |
| 6,393,129 B1 | 5/2002 | Conrad |
| 6,424,635 B1 | 7/2002 | Song |
| 6,442,272 B1 | 8/2002 | Osovets |
| 6,449,593 B1 | 9/2002 | Valve |
| 6,481,173 B1 | 11/2002 | Roy |
| 6,488,367 B1 | 12/2002 | Debesis |
| D469,090 S | 1/2003 | Tsuji |
| 6,505,057 B1 | 1/2003 | Finn |
| 6,507,659 B1 | 1/2003 | Iredale |
| 6,510,919 B1 | 1/2003 | Roy |
| 6,526,147 B1 | 2/2003 | Rung |
| 6,556,682 B1 | 4/2003 | Gilloire |
| 6,592,237 B1 | 7/2003 | Pledger |
| 6,622,030 B1 | 9/2003 | Romesburg |
| D480,923 S | 10/2003 | Neubourg |
| 6,633,647 B1 | 10/2003 | Markow |
| 6,665,971 B2 | 12/2003 | Lowry |
| 6,694,028 B1 | 2/2004 | Matsuo |
| 6,704,422 B1 | 3/2004 | Jensen |
| D489,707 S | 5/2004 | Kobayashi |
| 6,731,334 B1 | 5/2004 | Maeng |
| 6,741,720 B1 | 5/2004 | Myatt |
| 6,757,393 B1 | 6/2004 | Spitzer |
| 6,768,795 B2 | 7/2004 | Feltstroem |
| 6,868,377 B1 | 3/2005 | Laroche |
| 6,885,750 B2 | 4/2005 | Egelmeers |
| 6,885,986 B1 | 4/2005 | Gigi |
| D504,889 S | 5/2005 | Andre |
| 6,889,183 B1 | 5/2005 | Gunduzhan |
| 6,895,093 B1 | 5/2005 | Ali |
| 6,931,123 B1 | 8/2005 | Hughes |
| 6,944,312 B2 | 9/2005 | Mason |
| D510,729 S | 10/2005 | Chen |
| 6,968,064 B1 | 11/2005 | Ning |
| 6,990,193 B2 | 1/2006 | Beaucoup |
| 6,993,126 B1 | 1/2006 | Kyrylenko |
| 6,993,145 B2 | 1/2006 | Combest |
| 7,003,099 B1 | 2/2006 | Zhang |
| 7,013,267 B1 | 3/2006 | Huart |
| 7,031,269 B2 | 4/2006 | Lee |
| 7,035,398 B2 | 4/2006 | Matsuo |
| 7,035,415 B2 | 4/2006 | Belt |
| 7,050,576 B2 | 5/2006 | Zhang |
| 7,054,451 B2 | 5/2006 | Janse |
| D526,643 S | 8/2006 | Ishizaki |
| D527,372 S | 8/2006 | Allen |
| 7,092,516 B2 | 8/2006 | Furuta |
| 7,092,882 B2 | 8/2006 | Arrowood |
| 7,098,865 B2 | 8/2006 | Christensen |
| 7,106,876 B2 | 9/2006 | Santiago |
| 7,120,269 B2 | 10/2006 | Lowell |
| 7,130,309 B2 | 10/2006 | Boaz |
| D533,177 S | 12/2006 | Andre |
| 7,149,320 B2 | 12/2006 | Haykin |
| 7,161,534 B2 | 1/2007 | Tsai |
| 7,187,765 B2 | 3/2007 | Popovic |
| 7,203,308 B2 | 4/2007 | Kubota |
| D542,543 S | 5/2007 | Bruce |
| 7,212,628 B2 | 5/2007 | Popovic |
| D546,318 S | 7/2007 | Yoon |
| D546,814 S | 7/2007 | Takita |
| D547,748 S | 7/2007 | Tsuge |
| 7,239,714 B2 | 7/2007 | De Blok |
| D549,673 S | 8/2007 | Niitsu |
| 7,269,263 B2 | 9/2007 | Dedieu |
| D552,570 S | 10/2007 | Niitsu |
| D559,553 S | 1/2008 | Mischel |
| 7,333,476 B2 | 2/2008 | LeBlanc |
| D566,685 S | 4/2008 | Koller |
| 7,359,504 B1 | 4/2008 | Reuss |
| 7,366,310 B2 | 4/2008 | Stinson |
| 7,387,151 B1 | 6/2008 | Payne |
| 7,412,376 B2 | 8/2008 | Florencio |
| 7,415,117 B2 | 8/2008 | Tashev |
| D578,509 S | 10/2008 | Thomas |
| D581,510 S | 11/2008 | Albano |
| D582,391 S | 12/2008 | Morimoto |
| D587,709 S | 3/2009 | Niitsu |
| D589,605 S | 3/2009 | Reedy |
| 7,503,616 B2 | 3/2009 | Linhard |
| 7,515,719 B2 | 4/2009 | Hooley |
| 7,536,769 B2 | 5/2009 | Pedersen |
| D595,402 S | 6/2009 | Miyake |
| D595,736 S | 7/2009 | Son |
| 7,558,381 B1 | 7/2009 | Ali |
| 7,561,700 B1 | 7/2009 | Bernardi |
| 7,565,949 B2 | 7/2009 | Tojo |
| D601,585 S | 10/2009 | Andre |
| 7,651,390 B1 | 1/2010 | Profeta |
| 7,660,428 B2 | 2/2010 | Rodman |
| 7,667,728 B2 | 2/2010 | Kenoyer |
| 7,672,445 B1 | 3/2010 | Zhang |
| D613,338 S | 4/2010 | Marukos |
| 7,701,110 B2 | 4/2010 | Fukuda |
| 7,702,116 B2 | 4/2010 | Stone |
| D614,871 S | 5/2010 | Tang |
| 7,724,891 B2 | 5/2010 | Beaucoup |
| D617,441 S | 6/2010 | Koury |
| 7,747,001 B2 | 6/2010 | Kellermann |
| 7,756,278 B2 | 7/2010 | Moorer |
| 7,783,063 B2 | 8/2010 | Pocino |
| 7,787,328 B2 | 8/2010 | Chu |
| 7,830,862 B2 | 11/2010 | James |
| 7,831,035 B2 | 11/2010 | Stokes |
| 7,831,036 B2 | 11/2010 | Beaucoup |
| 7,856,097 B2 | 12/2010 | Tokuda |
| 7,881,459 B2 * | 2/2011 | Wu ........................ H04M 9/082 |
| | | 379/406.01 |
| 7,881,486 B1 | 2/2011 | Killion |
| 7,894,421 B2 | 2/2011 | Kwan |
| D636,188 S | 4/2011 | Kim |
| 7,925,006 B2 | 4/2011 | Hirai |
| 7,925,007 B2 | 4/2011 | Stokes |
| 7,936,886 B2 | 5/2011 | Kim |
| 7,970,123 B2 | 6/2011 | Beaucoup |
| 7,970,151 B2 | 6/2011 | Oxford |
| D642,385 S | 8/2011 | Lee |

(56) References Cited

U.S. PATENT DOCUMENTS

| | | | |
|---|---|---|---|
| D643,015 S | 8/2011 | Kim |
| 7,991,167 B2 | 8/2011 | Oxford |
| 7,995,768 B2 | 8/2011 | Miki |
| 8,000,481 B2 | 8/2011 | Nishikawa |
| 8,005,238 B2 | 8/2011 | Tashev |
| 8,019,091 B2 | 9/2011 | Burnett |
| 8,041,054 B2 | 10/2011 | Yeldener |
| 8,059,843 B2 | 11/2011 | Hung |
| 8,064,629 B2 | 11/2011 | Jiang |
| 8,085,947 B2 | 12/2011 | Haulick |
| 8,085,949 B2 | 12/2011 | Kim |
| 8,095,120 B1 | 1/2012 | Blair |
| 8,098,842 B2 | 1/2012 | Florencio |
| 8,098,844 B2 | 1/2012 | Elko |
| 8,103,030 B2 | 1/2012 | Barthel |
| 8,109,360 B2 | 2/2012 | Stewart, Jr. |
| 8,112,272 B2 | 2/2012 | Nagahama |
| 8,116,500 B2 | 2/2012 | Oxford |
| 8,121,834 B2 | 2/2012 | Rosec |
| D655,271 S | 3/2012 | Park |
| D656,473 S | 3/2012 | Laube |
| 8,130,969 B2 | 3/2012 | Buck |
| 8,130,977 B2 | 3/2012 | Chu |
| 8,135,143 B2 | 3/2012 | Ishibashi |
| 8,144,886 B2 | 3/2012 | Ishibashi |
| D658,153 S | 4/2012 | Woo |
| 8,155,331 B2 | 4/2012 | Nakadai |
| 8,170,882 B2 | 5/2012 | Davis |
| 8,175,291 B2 | 5/2012 | Chan |
| 8,175,871 B2 | 5/2012 | Wang |
| 8,184,801 B1 | 5/2012 | Hamalainen |
| 8,189,765 B2 | 5/2012 | Nishikawa |
| 8,189,810 B2 | 5/2012 | Wolff |
| 8,194,863 B2 | 6/2012 | Takumai |
| 8,199,927 B1 | 6/2012 | Raftery |
| 8,204,198 B2 | 6/2012 | Adeney |
| 8,204,248 B2 | 6/2012 | Haulick |
| 8,208,664 B2 | 6/2012 | Iwasaki |
| 8,213,596 B2 | 7/2012 | Beaucoup |
| 8,213,634 B1 | 7/2012 | Daniel |
| 8,219,387 B2 | 7/2012 | Cutler |
| 8,229,134 B2 | 7/2012 | Duraiswami |
| 8,233,352 B2 | 7/2012 | Beaucoup |
| 8,243,951 B2 | 8/2012 | Ishibashi |
| 8,244,536 B2 | 8/2012 | Arun |
| 8,249,273 B2 | 8/2012 | Inoda |
| 8,259,959 B2 | 9/2012 | Marton |
| 8,275,120 B2 | 9/2012 | Stokes, III |
| 8,280,728 B2 | 10/2012 | Chen |
| 8,284,949 B2 | 10/2012 | Farhang |
| 8,284,952 B2 | 10/2012 | Reining |
| 8,286,749 B2 | 10/2012 | Stewart |
| 8,290,142 B1 | 10/2012 | Lambert |
| 8,291,670 B2 | 10/2012 | Gard |
| 8,297,402 B2 | 10/2012 | Stewart |
| 8,315,380 B2 | 11/2012 | Liu |
| 8,331,582 B2 | 12/2012 | Steele |
| 8,345,898 B2 | 1/2013 | Reining |
| 8,355,521 B2 | 1/2013 | Larson |
| 8,370,140 B2 | 2/2013 | Guillaume |
| 8,379,823 B2 | 2/2013 | Ratmanski |
| 8,385,557 B2 | 2/2013 | Tashev |
| D678,329 S | 3/2013 | Lee |
| 8,395,653 B2 | 3/2013 | Feng |
| 8,403,107 B2 | 3/2013 | Stewart |
| 8,406,436 B2 | 3/2013 | Craven |
| 8,428,661 B2 | 4/2013 | Chen |
| 8,433,061 B2 | 4/2013 | Cutler |
| D682,266 S | 5/2013 | Wu |
| 8,437,490 B2 | 5/2013 | Marton |
| 8,443,930 B2 | 5/2013 | Stewart, Jr. |
| 8,447,590 B2 | 5/2013 | Ishibashi |
| 8,472,639 B2 | 6/2013 | Reining |
| 8,472,640 B2 | 6/2013 | Marton |
| D685,346 S | 7/2013 | Szymanski |
| D686,182 S | 7/2013 | Ashiwa |
| 8,479,871 B2 | 7/2013 | Stewart |
| 8,483,398 B2 | 7/2013 | Fozunbal |
| 8,498,423 B2 | 7/2013 | Thaden |
| D687,432 S | 8/2013 | Duan |
| 8,503,653 B2 | 8/2013 | Ahuja |
| 8,515,089 B2 | 8/2013 | Nicholson |
| 8,515,109 B2 | 8/2013 | Dittberner |
| 8,526,633 B2 | 9/2013 | Ukai |
| 8,553,904 B2 | 10/2013 | Said |
| 8,559,611 B2 | 10/2013 | Ratmanski |
| D693,328 S | 11/2013 | Goetzen |
| 8,583,481 B2 | 11/2013 | Walter |
| 8,599,194 B2 | 12/2013 | Lewis |
| 8,600,443 B2 | 12/2013 | Kawaguchi |
| 8,605,890 B2 | 12/2013 | Zhang |
| 8,620,650 B2 | 12/2013 | Walters |
| 8,630,431 B2 | 1/2014 | Gran |
| 8,631,897 B2 | 1/2014 | Stewart |
| 8,634,569 B2 | 1/2014 | Lu |
| 8,638,951 B2 | 1/2014 | Zurek |
| D699,712 S | 2/2014 | Bourne |
| 8,644,477 B2 | 2/2014 | Gilbert |
| 8,654,955 B1 | 2/2014 | Lambert |
| 8,654,990 B2 | 2/2014 | Faller |
| 8,660,274 B2 | 2/2014 | Wolff |
| 8,660,275 B2 | 2/2014 | Buck |
| 8,670,581 B2 | 3/2014 | Harman |
| 8,672,087 B2 | 3/2014 | Stewart |
| 8,675,890 B2 | 3/2014 | Schmidt |
| 8,675,899 B2 | 3/2014 | Jung |
| 8,676,728 B1 | 3/2014 | Velusamy |
| 8,682,675 B2 | 3/2014 | Togami |
| 8,724,829 B2 | 5/2014 | Erik |
| 8,730,156 B2 | 5/2014 | Weising |
| 8,744,069 B2 | 6/2014 | Cutler |
| 8,744,101 B1 | 6/2014 | Burns |
| 8,755,536 B2 | 6/2014 | Chen |
| 8,787,560 B2 | 7/2014 | Buck |
| 8,811,601 B2 | 8/2014 | Mohammad |
| 8,818,002 B2 | 8/2014 | Tashev |
| 8,824,693 B2 | 9/2014 | Per |
| 8,842,851 B2 | 9/2014 | Beaucoup |
| 8,855,326 B2 | 10/2014 | Derkx |
| 8,855,327 B2 | 10/2014 | Tanaka |
| 8,861,713 B2 | 10/2014 | Xu |
| 8,861,756 B2 | 10/2014 | Zhu |
| 8,873,789 B2 | 10/2014 | Bigeh |
| D717,272 S | 11/2014 | Kim |
| 8,886,343 B2 | 11/2014 | Ishibashi |
| 8,893,849 B2 | 11/2014 | Hudson |
| 8,898,633 B2 | 11/2014 | Bryant |
| D718,731 S | 12/2014 | Lee |
| 8,903,106 B2 | 12/2014 | Meyer |
| 8,923,529 B2 | 12/2014 | Mccowan |
| 8,929,564 B2 | 1/2015 | Kikkeri |
| 8,942,382 B2 | 1/2015 | Elko |
| 8,965,546 B2 | 2/2015 | Erik |
| D725,059 S | 3/2015 | Kim |
| D725,631 S | 3/2015 | Mcnamara |
| 8,976,977 B2 | 3/2015 | De |
| 8,983,089 B1 | 3/2015 | Chu |
| 8,983,834 B2 | 3/2015 | Davis |
| D726,144 S | 4/2015 | Kang |
| D727,968 S | 4/2015 | Onoue |
| 9,001,994 B1* | 4/2015 | Yang ................... H04M 9/082 |
| | | 379/406.14 |
| 9,002,028 B2 | 4/2015 | Haulick |
| D729,767 S | 5/2015 | Lee |
| 9,038,301 B2 | 5/2015 | Zelbacher |
| 9,088,336 B2 | 7/2015 | Mani |
| 9,094,496 B2 | 7/2015 | Teutsch |
| D735,717 S | 8/2015 | Lam |
| D737,245 S | 8/2015 | Fan |
| 9,099,094 B2 | 8/2015 | Burnett |
| 9,107,001 B2 | 8/2015 | Diethorn |
| 9,111,543 B2 | 8/2015 | Per |
| 9,113,242 B2 | 8/2015 | Hyun |
| 9,113,247 B2 | 8/2015 | Chatlani |

(56) References Cited

U.S. PATENT DOCUMENTS

| | | | |
|---|---|---|---|
| 9,126,827 B2 | 9/2015 | Hsieh | |
| 9,129,223 B1 | 9/2015 | Velusamy | |
| 9,140,054 B2 | 9/2015 | Oberbroeckling | |
| D740,279 S | 10/2015 | Wu | |
| 9,172,345 B2 | 10/2015 | Kok | |
| D743,376 S | 11/2015 | Kim | |
| D743,939 S | 11/2015 | Seong | |
| 9,196,261 B2 | 11/2015 | Burnett | |
| 9,197,974 B1 | 11/2015 | Clark | |
| 9,203,494 B2 | 12/2015 | Tarighat Mehrabani | |
| 9,215,327 B2 | 12/2015 | Bathurst | |
| 9,215,543 B2 | 12/2015 | Sun | |
| 9,226,062 B2 | 12/2015 | Sun | |
| 9,226,070 B2 | 12/2015 | Hyun | |
| 9,226,088 B2 | 12/2015 | Pandey | |
| 9,232,185 B2 | 1/2016 | Graham | |
| 9,237,391 B2 | 1/2016 | Benesty | |
| 9,247,367 B2 | 1/2016 | Nobile | |
| 9,253,567 B2 | 2/2016 | Morcelli | |
| 9,257,132 B2 | 2/2016 | Gowreesunker | |
| 9,264,553 B2 | 2/2016 | Pandey | |
| 9,264,805 B2 | 2/2016 | Buck | |
| 9,280,985 B2 | 3/2016 | Tawada | |
| 9,286,908 B2 | 3/2016 | Zhang | |
| 9,294,839 B2 | 3/2016 | Lambert | |
| 9,301,049 B2 | 3/2016 | Elko | |
| D754,103 S | 4/2016 | Fischer | |
| 9,307,326 B2 | 4/2016 | Elko | |
| 9,319,532 B2 | 4/2016 | Bao | |
| 9,319,783 B1* | 4/2016 | Barton | H04M 9/082 |
| 9,319,799 B2 | 4/2016 | Salmon | |
| 9,326,060 B2 | 4/2016 | Nicholson | |
| D756,502 S | 5/2016 | Lee | |
| 9,330,673 B2 | 5/2016 | Cho | |
| 9,338,301 B2 | 5/2016 | Pocino | |
| 9,338,549 B2 | 5/2016 | Haulick | |
| 9,354,310 B2 | 5/2016 | Erik | |
| 9,357,080 B2 | 5/2016 | Beaucoup | |
| 9,403,670 B2 | 8/2016 | Schelling | |
| 9,426,598 B2 | 8/2016 | Walsh | |
| D767,748 S | 9/2016 | Nakai | |
| 9,451,078 B2 | 9/2016 | Yang | |
| D769,239 S | 10/2016 | Li | |
| 9,462,378 B2 | 10/2016 | Kuech | |
| 9,473,868 B2 | 10/2016 | Huang | |
| 9,479,627 B1 | 10/2016 | Rung | |
| 9,479,885 B1 | 10/2016 | Ivanov | |
| 9,489,948 B1 | 11/2016 | Chu | |
| 9,510,090 B2 | 11/2016 | Lissek | |
| 9,514,723 B2 | 12/2016 | Silfvast | |
| 9,516,412 B2 | 12/2016 | Shigenaga | |
| 9,521,057 B2 | 12/2016 | Klingbeil | |
| 9,549,245 B2 | 1/2017 | Frater | |
| 9,560,446 B1 | 1/2017 | Chang | |
| 9,560,451 B2 | 1/2017 | Eichfeld | |
| 9,565,493 B2 | 2/2017 | Abraham | |
| 9,565,507 B2 | 2/2017 | Case | |
| 9,578,413 B2 | 2/2017 | Sawa | |
| 9,578,440 B2 | 2/2017 | Otto | |
| 9,589,556 B2 | 3/2017 | Gao | |
| 9,591,123 B2 | 3/2017 | Sorensen | |
| 9,591,404 B1 | 3/2017 | Chhetri | |
| D784,299 S | 4/2017 | Cho | |
| 9,615,173 B2 | 4/2017 | Sako | |
| 9,628,596 B1 | 4/2017 | Bullough | |
| 9,635,186 B2 | 4/2017 | Pandey | |
| 9,635,474 B2 | 4/2017 | Kuster | |
| D787,481 S | 5/2017 | Jorunn | |
| D788,073 S | 5/2017 | Silvera | |
| 9,640,187 B2 | 5/2017 | Niemisto | |
| 9,641,688 B2 | 5/2017 | Pandey | |
| 9,641,929 B2 | 5/2017 | Li | |
| 9,641,935 B1 | 5/2017 | Ivanov | |
| 9,653,091 B2 | 5/2017 | Matsuo | |
| 9,653,092 B2 | 5/2017 | Sun | |
| 9,655,001 B2 | 5/2017 | Metzger | |
| 9,659,576 B1 | 5/2017 | Kotvis | |
| D789,323 S | 6/2017 | Mackiewicz | |
| 9,674,604 B2 | 6/2017 | Deroo | |
| 9,692,882 B2 | 6/2017 | Mani | |
| 9,706,057 B2 | 7/2017 | Mani | |
| 9,716,944 B2 | 7/2017 | Yliaho | |
| 9,721,582 B1 | 8/2017 | Huang | |
| 9,734,835 B2 | 8/2017 | Fujieda | |
| 9,754,572 B2 | 9/2017 | Salazar | |
| 9,761,243 B2 | 9/2017 | Taenzer | |
| D801,285 S | 10/2017 | Timmins | |
| 9,788,119 B2 | 10/2017 | Miikka | |
| 9,813,806 B2 | 11/2017 | Graham | |
| 9,818,426 B2 | 11/2017 | Kotera | |
| 9,826,211 B2 | 11/2017 | Sawa | |
| 9,842,606 B2* | 12/2017 | Ushakov | H04M 9/08 |
| 9,854,101 B2 | 12/2017 | Pandey | |
| 9,854,363 B2 | 12/2017 | Sladeczek | |
| 9,860,439 B2 | 1/2018 | Sawa | |
| 9,866,952 B2 | 1/2018 | Pandey | |
| D811,393 S | 2/2018 | Ahn | |
| 9,894,434 B2 | 2/2018 | Rollow, IV | |
| 9,930,448 B1 | 3/2018 | Chen | |
| 9,936,290 B2 | 4/2018 | Mohammad | |
| 9,966,059 B1 | 5/2018 | Ayrapetian | |
| 9,973,848 B2 | 5/2018 | Chhetri | |
| 9,980,042 B1 | 5/2018 | Benattar | |
| D819,607 S | 6/2018 | Chui | |
| D819,631 S | 6/2018 | Matsumiya | |
| 10,015,589 B1 | 7/2018 | Ebenezer | |
| 10,021,506 B2 | 7/2018 | Johnson | |
| 10,021,515 B1 | 7/2018 | Mallya | |
| 10,034,116 B2 | 7/2018 | Kadri | |
| 10,038,769 B2 | 7/2018 | Ukai | |
| 10,054,320 B2 | 8/2018 | Choi | |
| 10,061,009 B1 | 8/2018 | Family | |
| 10,062,379 B2 | 8/2018 | Katuri | |
| 10,115,411 B1* | 10/2018 | Chu | G10L 21/0232 |
| 10,153,744 B1 | 12/2018 | Every | |
| 10,165,386 B2 | 12/2018 | Lehtiniemi | |
| D841,589 S | 2/2019 | Böhmer | |
| 10,206,030 B2 | 2/2019 | Matsumoto | |
| 10,210,882 B1 | 2/2019 | Mccowan | |
| 10,231,062 B2 | 3/2019 | Pedersen | |
| 10,244,121 B2 | 3/2019 | Mani | |
| 10,244,219 B2 | 3/2019 | Sawa | |
| 10,269,343 B2 | 4/2019 | Wingate | |
| 10,355,658 B1* | 7/2019 | Yang | H03G 9/025 |
| 10,366,702 B2 | 7/2019 | Morton | |
| 10,367,948 B2 | 7/2019 | Wells-Rutherford | |
| D857,873 S | 8/2019 | Shimada | |
| 10,389,861 B2 | 8/2019 | Mani | |
| 10,389,885 B2 | 8/2019 | Sun | |
| D860,319 S | 9/2019 | Beruto | |
| D860,997 S | 9/2019 | Jhun | |
| D864,136 S | 10/2019 | Kim | |
| 10,440,469 B2 | 10/2019 | Barnett | |
| D865,723 S | 11/2019 | Cho | |
| 10,566,008 B2 | 2/2020 | Thorpe | |
| 10,602,267 B2 | 3/2020 | Grosche | |
| D883,952 S | 5/2020 | Lucas | |
| 10,650,797 B2 | 5/2020 | Kumar | |
| D888,020 S | 6/2020 | Lyu | |
| 10,728,653 B2 | 7/2020 | Graham | |
| D900,070 S | 10/2020 | Lantz | |
| D900,071 S | 10/2020 | Lantz | |
| D900,072 S | 10/2020 | Lantz | |
| D900,073 S | 10/2020 | Lantz | |
| D900,074 S | 10/2020 | Lantz | |
| 10,827,263 B2 | 11/2020 | Christoph | |
| 10,863,270 B1 | 12/2020 | O'Neill | |
| 10,930,297 B2 | 2/2021 | Christoph | |
| 10,959,018 B1 | 3/2021 | Shi | |
| 10,979,805 B2 | 4/2021 | Chowdhary | |
| D924,189 S | 7/2021 | Park | |
| 11,109,133 B2 | 8/2021 | Lantz | |
| D940,116 S | 1/2022 | Cho | |
| 11,218,802 B1 | 1/2022 | Kandadai | |

(56) References Cited

U.S. PATENT DOCUMENTS

| | | | |
|---|---|---|---|
| 11,310,592 B2 | 4/2022 | Abraham | |
| 12,051,434 B2* | 7/2024 | Shabestary | ......... G10L 21/0224 |
| 2001/0031058 A1 | 10/2001 | Anderson | |
| 2002/0015500 A1 | 2/2002 | Belt | |
| 2002/0041679 A1 | 4/2002 | Beaucoup | |
| 2002/0048377 A1 | 4/2002 | Vaudrey | |
| 2002/0064158 A1 | 5/2002 | Yokoyama | |
| 2002/0064287 A1 | 5/2002 | Kawamura | |
| 2002/0069054 A1 | 6/2002 | Arrowood | |
| 2002/0110255 A1 | 8/2002 | Killion | |
| 2002/0126861 A1 | 9/2002 | Colby | |
| 2002/0131580 A1 | 9/2002 | Smith | |
| 2002/0140633 A1 | 10/2002 | Rafii | |
| 2002/0146282 A1 | 10/2002 | Wilkes | |
| 2002/0149070 A1 | 10/2002 | Sheplak | |
| 2002/0159603 A1 | 10/2002 | Hirai | |
| 2003/0026437 A1 | 2/2003 | Janse | |
| 2003/0053639 A1 | 3/2003 | Beaucoup | |
| 2003/0059061 A1 | 3/2003 | Tsuji | |
| 2003/0063762 A1 | 4/2003 | Tajima | |
| 2003/0063768 A1 | 4/2003 | Cornelius | |
| 2003/0072461 A1 | 4/2003 | Moorer | |
| 2003/0107478 A1 | 6/2003 | Hendricks | |
| 2003/0118200 A1 | 6/2003 | Beaucoup | |
| 2003/0122777 A1 | 7/2003 | Grover | |
| 2003/0138119 A1 | 7/2003 | Pocino | |
| 2003/0156725 A1 | 8/2003 | Boone | |
| 2003/0161485 A1 | 8/2003 | Smith | |
| 2003/0163326 A1 | 8/2003 | Maase | |
| 2003/0169888 A1 | 9/2003 | Subotic | |
| 2003/0185404 A1 | 10/2003 | Milsap | |
| 2003/0198339 A1 | 10/2003 | Roy | |
| 2003/0198359 A1 | 10/2003 | Killion | |
| 2003/0202107 A1 | 10/2003 | Slattery | |
| 2004/0013038 A1 | 1/2004 | Kajala | |
| 2004/0013252 A1 | 1/2004 | Craner | |
| 2004/0076305 A1 | 4/2004 | Santiago | |
| 2004/0105557 A1 | 6/2004 | Matsuo | |
| 2004/0125942 A1 | 7/2004 | Beaucoup | |
| 2004/0175006 A1 | 9/2004 | Kim | |
| 2004/0202345 A1 | 10/2004 | Stenberg | |
| 2004/0240664 A1 | 12/2004 | Freed | |
| 2005/0005494 A1 | 1/2005 | Way | |
| 2005/0041530 A1 | 2/2005 | Goudie | |
| 2005/0069156 A1 | 3/2005 | Haapapuro | |
| 2005/0094580 A1 | 5/2005 | Kumar | |
| 2005/0094795 A1 | 5/2005 | Rambo | |
| 2005/0149320 A1 | 7/2005 | Kajala | |
| 2005/0157897 A1 | 7/2005 | Saltykov | |
| 2005/0175189 A1 | 8/2005 | Lee | |
| 2005/0175190 A1 | 8/2005 | Tashev | |
| 2005/0213747 A1 | 9/2005 | Popovich | |
| 2005/0221867 A1 | 10/2005 | Zurek | |
| 2005/0238196 A1 | 10/2005 | Furuno | |
| 2005/0270906 A1 | 12/2005 | Ramenzoni | |
| 2005/0271221 A1 | 12/2005 | Cerwin | |
| 2005/0286698 A1 | 12/2005 | Bathurst | |
| 2005/0286729 A1 | 12/2005 | Harwood | |
| 2006/0083390 A1 | 4/2006 | Kaderavek | |
| 2006/0088173 A1 | 4/2006 | Rodman | |
| 2006/0093128 A1 | 5/2006 | Oxford | |
| 2006/0098403 A1 | 5/2006 | Smith | |
| 2006/0104458 A1 | 5/2006 | Kenoyer | |
| 2006/0109983 A1 | 5/2006 | Young | |
| 2006/0151256 A1 | 7/2006 | Lee | |
| 2006/0159293 A1 | 7/2006 | Azima | |
| 2006/0161430 A1 | 7/2006 | Schweng | |
| 2006/0165242 A1 | 7/2006 | Miki | |
| 2006/0192976 A1 | 8/2006 | Hall | |
| 2006/0198541 A1 | 9/2006 | Henry | |
| 2006/0204022 A1 | 9/2006 | Hooley | |
| 2006/0215866 A1 | 9/2006 | Francisco | |
| 2006/0222187 A1 | 10/2006 | Jarrett | |
| 2006/0233353 A1 | 10/2006 | Beaucoup | |
| 2006/0239471 A1 | 10/2006 | Mao | |
| 2006/0262942 A1 | 11/2006 | Oxford | |
| 2006/0269080 A1 | 11/2006 | Oxford | |
| 2006/0269086 A1 | 11/2006 | Page | |
| 2007/0006474 A1 | 1/2007 | Taniguchi | |
| 2007/0009116 A1 | 1/2007 | Reining | |
| 2007/0019828 A1 | 1/2007 | Hughes | |
| 2007/0053524 A1 | 3/2007 | Haulick | |
| 2007/0093714 A1 | 4/2007 | Beaucoup | |
| 2007/0112571 A1* | 5/2007 | Thirugnana | ......... H04M 1/2757 |
| | | | 704/201 |
| 2007/0116255 A1 | 5/2007 | Derkx | |
| 2007/0120029 A1 | 5/2007 | Keung | |
| 2007/0165871 A1 | 7/2007 | Roovers | |
| 2007/0230712 A1 | 10/2007 | Belt | |
| 2007/0253561 A1 | 11/2007 | Williams | |
| 2007/0269066 A1 | 11/2007 | Derleth | |
| 2008/0008339 A1 | 1/2008 | Ryan | |
| 2008/0033723 A1 | 2/2008 | Jang | |
| 2008/0046235 A1 | 2/2008 | Chen | |
| 2008/0056517 A1 | 3/2008 | Algazi | |
| 2008/0101622 A1 | 5/2008 | Sugiyama | |
| 2008/0130907 A1 | 6/2008 | Sudo | |
| 2008/0144848 A1 | 6/2008 | Buck | |
| 2008/0152167 A1 | 6/2008 | Taenzer | |
| 2008/0168283 A1 | 7/2008 | Penning | |
| 2008/0175375 A1 | 7/2008 | Ishiguro | |
| 2008/0188965 A1 | 8/2008 | Bruey | |
| 2008/0212805 A1 | 9/2008 | Fincham | |
| 2008/0232607 A1 | 9/2008 | Tashev | |
| 2008/0247567 A1 | 10/2008 | Kjolerbakken | |
| 2008/0253553 A1 | 10/2008 | Li | |
| 2008/0253589 A1 | 10/2008 | Trahms | |
| 2008/0259731 A1 | 10/2008 | Happonen | |
| 2008/0260175 A1 | 10/2008 | Elko | |
| 2008/0267422 A1 | 10/2008 | Cox | |
| 2008/0279400 A1 | 11/2008 | Knoll | |
| 2008/0285772 A1 | 11/2008 | Haulick | |
| 2009/0003586 A1 | 1/2009 | Lai | |
| 2009/0003626 A1 | 1/2009 | Burnett | |
| 2009/0030536 A1 | 1/2009 | Gur | |
| 2009/0046847 A1* | 2/2009 | Wu | ..................... H04M 9/082 |
| | | | 379/406.01 |
| 2009/0052684 A1 | 2/2009 | Ishibashi | |
| 2009/0052686 A1 | 2/2009 | Wu | |
| 2009/0052715 A1 | 2/2009 | Zhang | |
| 2009/0086998 A1 | 4/2009 | Jeong | |
| 2009/0087000 A1 | 4/2009 | Ko | |
| 2009/0087001 A1 | 4/2009 | Jiang | |
| 2009/0094817 A1 | 4/2009 | Killion | |
| 2009/0129609 A1 | 5/2009 | Oh | |
| 2009/0147967 A1 | 6/2009 | Ishibashi | |
| 2009/0150149 A1 | 6/2009 | Cutter | |
| 2009/0161880 A1 | 6/2009 | Hooley | |
| 2009/0169027 A1 | 7/2009 | Ura | |
| 2009/0173030 A1 | 7/2009 | Gulbrandsen | |
| 2009/0173570 A1 | 7/2009 | Levit | |
| 2009/0226004 A1 | 9/2009 | Moeller | |
| 2009/0233545 A1 | 9/2009 | Sutskover | |
| 2009/0235870 A1 | 9/2009 | Troy | |
| 2009/0237561 A1 | 9/2009 | Kobayashi | |
| 2009/0254340 A1 | 10/2009 | Sun | |
| 2009/0274318 A1 | 11/2009 | Ishibashi | |
| 2009/0287482 A1 | 11/2009 | Hetherington | |
| 2009/0310794 A1 | 12/2009 | Ishibashi | |
| 2010/0011644 A1 | 1/2010 | Kramer | |
| 2010/0034397 A1 | 2/2010 | Nakadai | |
| 2010/0074433 A1 | 3/2010 | Zhang | |
| 2010/0111323 A1 | 5/2010 | Marton | |
| 2010/0111324 A1 | 5/2010 | Yeldener | |
| 2010/0119097 A1 | 5/2010 | Ohtsuka | |
| 2010/0123785 A1 | 5/2010 | Chen | |
| 2010/0128892 A1 | 5/2010 | Chen | |
| 2010/0128901 A1 | 5/2010 | Herman | |
| 2010/0131749 A1 | 5/2010 | Kim | |
| 2010/0142721 A1 | 6/2010 | Wada | |
| 2010/0150364 A1 | 6/2010 | Buck | |
| 2010/0158268 A1 | 6/2010 | Marton | |
| 2010/0165071 A1 | 7/2010 | Ishibashi | |
| 2010/0166219 A1 | 7/2010 | Marton | |

(56)  References Cited

U.S. PATENT DOCUMENTS

| | | |
|---|---|---|
| 2010/0189275 A1 | 7/2010 | Christoph |
| 2010/0189299 A1 | 7/2010 | Grant |
| 2010/0202628 A1 | 8/2010 | Meyer |
| 2010/0208605 A1 | 8/2010 | Wang |
| 2010/0215184 A1 | 8/2010 | Buck |
| 2010/0215189 A1 | 8/2010 | Marton |
| 2010/0217590 A1 | 8/2010 | Nemer |
| 2010/0245624 A1 | 9/2010 | Beaucoup |
| 2010/0246873 A1 | 9/2010 | Chen |
| 2010/0284185 A1 | 11/2010 | Ngai |
| 2010/0305728 A1 | 12/2010 | Aiso |
| 2010/0314513 A1 | 12/2010 | Evans |
| 2010/0329478 A1 | 12/2010 | Kubin |
| 2011/0002469 A1 | 1/2011 | Ojala |
| 2011/0007921 A1 | 1/2011 | Stewart |
| 2011/0033063 A1 | 2/2011 | Mcgrath |
| 2011/0038229 A1 | 2/2011 | Beaucoup |
| 2011/0096136 A1 | 4/2011 | Liu |
| 2011/0096631 A1 | 4/2011 | Kondo |
| 2011/0096915 A1 | 4/2011 | Nemer |
| 2011/0164761 A1 | 7/2011 | Mccowan |
| 2011/0194719 A1 | 8/2011 | Frater |
| 2011/0211706 A1 | 9/2011 | Tanaka |
| 2011/0235821 A1 | 9/2011 | Okita |
| 2011/0268287 A1 | 11/2011 | Ishibashi |
| 2011/0311064 A1 | 12/2011 | Teutsch |
| 2011/0311085 A1 | 12/2011 | Stewart |
| 2011/0317862 A1 | 12/2011 | Hosoe |
| 2012/0002835 A1 | 1/2012 | Stewart |
| 2012/0014049 A1 | 1/2012 | Ogle |
| 2012/0027227 A1 | 2/2012 | Kok |
| 2012/0070015 A1 | 3/2012 | Oh |
| 2012/0076316 A1 | 3/2012 | Zhu |
| 2012/0080260 A1 | 4/2012 | Stewart |
| 2012/0093344 A1 | 4/2012 | Sun |
| 2012/0106755 A1 | 5/2012 | Zhang |
| 2012/0117474 A1 | 5/2012 | Miki |
| 2012/0128160 A1 | 5/2012 | Kim |
| 2012/0128166 A1 | 5/2012 | Kim |
| 2012/0128175 A1 | 5/2012 | Visser |
| 2012/0155688 A1 | 6/2012 | Wilson |
| 2012/0155703 A1 | 6/2012 | Hernandez-Abrego |
| 2012/0163625 A1 | 6/2012 | Siotis |
| 2012/0169826 A1 | 7/2012 | Jeong |
| 2012/0177219 A1 | 7/2012 | Mullen |
| 2012/0182429 A1 | 7/2012 | Forutanpour |
| 2012/0207335 A1 | 8/2012 | Spaanderman |
| 2012/0224709 A1 | 9/2012 | Keddem |
| 2012/0230511 A1 | 9/2012 | Burnett |
| 2012/0243698 A1 | 9/2012 | Elko |
| 2012/0262536 A1 | 10/2012 | Chen |
| 2012/0263019 A1 | 10/2012 | Armstong-Muntner |
| 2012/0288079 A1 | 11/2012 | Burnett |
| 2012/0288114 A1 | 11/2012 | Duraiswami |
| 2012/0294472 A1 | 11/2012 | Hudson |
| 2012/0327115 A1 | 12/2012 | Chhetri |
| 2012/0328142 A1 | 12/2012 | Horibe |
| 2013/0002797 A1 | 1/2013 | Thapa |
| 2013/0004013 A1 | 1/2013 | Stewart |
| 2013/0015014 A1 | 1/2013 | Stewart |
| 2013/0016847 A1 | 1/2013 | Steiner |
| 2013/0028451 A1 | 1/2013 | De Roo |
| 2013/0029684 A1 | 1/2013 | Kawaguchi |
| 2013/0034241 A1 | 2/2013 | Pandey |
| 2013/0039504 A1 | 2/2013 | Pandey |
| 2013/0083911 A1 | 4/2013 | Bathurst |
| 2013/0094689 A1 | 4/2013 | Tanaka |
| 2013/0101136 A1 | 4/2013 | Mcelveen |
| 2013/0101141 A1 | 4/2013 | Mcelveen |
| 2013/0136274 A1 | 5/2013 | Per |
| 2013/0142343 A1 | 6/2013 | Matsui |
| 2013/0147835 A1 | 6/2013 | Lee |
| 2013/0156198 A1 | 6/2013 | Kim |
| 2013/0182190 A1 | 7/2013 | Mccartney |
| 2013/0206501 A1 | 8/2013 | Yu |
| 2013/0216066 A1 | 8/2013 | Yerrace |
| 2013/0226593 A1 | 8/2013 | Magnusson |
| 2013/0251181 A1 | 9/2013 | Stewart |
| 2013/0264144 A1 | 10/2013 | Hudson |
| 2013/0271559 A1 | 10/2013 | Feng |
| 2013/0282372 A1 | 10/2013 | Erik |
| 2013/0294616 A1 | 11/2013 | Mulder |
| 2013/0297302 A1 | 11/2013 | Pan |
| 2013/0304476 A1 | 11/2013 | Kim |
| 2013/0304479 A1 | 11/2013 | Teller |
| 2013/0329908 A1 | 12/2013 | Lindahl |
| 2013/0332156 A1 | 12/2013 | Tackin |
| 2013/0336516 A1 | 12/2013 | Stewart |
| 2013/0343549 A1 | 12/2013 | Vemireddy |
| 2014/0003635 A1 | 1/2014 | Mohammad |
| 2014/0010383 A1 | 1/2014 | Mackey |
| 2014/0016794 A1 | 1/2014 | Lu |
| 2014/0029761 A1 | 1/2014 | Maenpaa |
| 2014/0037097 A1 | 2/2014 | Mark |
| 2014/0050332 A1 | 2/2014 | Nielsen |
| 2014/0072151 A1 | 3/2014 | Ochs |
| 2014/0098233 A1 | 4/2014 | Martin |
| 2014/0098964 A1 | 4/2014 | Rosca |
| 2014/0112496 A1 | 4/2014 | Murgia |
| 2014/0122060 A1 | 5/2014 | Kaszczuk |
| 2014/0126746 A1 | 5/2014 | Shin |
| 2014/0177857 A1 | 6/2014 | Kuster |
| 2014/0233777 A1 | 8/2014 | Tseng |
| 2014/0233778 A1 | 8/2014 | Hardiman |
| 2014/0264654 A1 | 9/2014 | Salmon |
| 2014/0265774 A1 | 9/2014 | Stewart |
| 2014/0270271 A1 | 9/2014 | Dehe |
| 2014/0286518 A1 | 9/2014 | Stewart |
| 2014/0294211 A1 | 10/2014 | Schneider |
| 2014/0295768 A1 | 10/2014 | Wu |
| 2014/0301586 A1 | 10/2014 | Stewart |
| 2014/0307882 A1 | 10/2014 | Leblanc |
| 2014/0314251 A1 | 10/2014 | Rosca |
| 2014/0335917 A1* | 11/2014 | Tetelbaum ............ H04M 9/082 |
| | | 455/570 |
| 2014/0341392 A1 | 11/2014 | Lambert |
| 2014/0357177 A1 | 12/2014 | Stewart |
| 2014/0363008 A1 | 12/2014 | Chen |
| 2015/0003638 A1 | 1/2015 | Kasai |
| 2015/0024799 A1 | 1/2015 | Swanson |
| 2015/0025878 A1 | 1/2015 | Gowreesunker |
| 2015/0030172 A1 | 1/2015 | Gaensler |
| 2015/0033042 A1 | 1/2015 | Iwamoto |
| 2015/0050967 A1 | 2/2015 | Bao |
| 2015/0055796 A1 | 2/2015 | Nugent |
| 2015/0055797 A1 | 2/2015 | Nguyen |
| 2015/0063579 A1 | 3/2015 | Bao |
| 2015/0070188 A1 | 3/2015 | Aramburu |
| 2015/0078581 A1 | 3/2015 | Etter |
| 2015/0078582 A1 | 3/2015 | Graham |
| 2015/0097719 A1 | 4/2015 | Balachandreswaran |
| 2015/0104023 A1 | 4/2015 | Bilobrov |
| 2015/0117672 A1 | 4/2015 | Christoph |
| 2015/0118960 A1 | 4/2015 | Petit |
| 2015/0126255 A1 | 5/2015 | Yang |
| 2015/0156578 A1 | 6/2015 | Alexandridis |
| 2015/0163577 A1 | 6/2015 | Benesty |
| 2015/0185825 A1 | 7/2015 | Mullins |
| 2015/0189423 A1 | 7/2015 | Giannuzzi |
| 2015/0195644 A1 | 7/2015 | Wilson |
| 2015/0208171 A1 | 7/2015 | Funakoshi |
| 2015/0237424 A1 | 8/2015 | Wilker |
| 2015/0281832 A1 | 10/2015 | Kishimoto |
| 2015/0281833 A1 | 10/2015 | Shigenaga |
| 2015/0281834 A1 | 10/2015 | Takano |
| 2015/0312662 A1 | 10/2015 | Kishimoto |
| 2015/0312691 A1 | 10/2015 | Jussi |
| 2015/0326968 A1 | 11/2015 | Shigenaga |
| 2015/0341734 A1 | 11/2015 | Sherman |
| 2015/0350621 A1 | 12/2015 | Sawa |
| 2015/0358734 A1 | 12/2015 | Butler |
| 2016/0011851 A1 | 1/2016 | Zhang |
| 2016/0021478 A1 | 1/2016 | Katagiri |
| 2016/0029120 A1 | 1/2016 | Nesta |

(56)  References Cited

U.S. PATENT DOCUMENTS

| | | |
|---|---|---|
| 2016/0031700 A1 | 2/2016 | Sparks |
| 2016/0037277 A1 | 2/2016 | Matsumoto |
| 2016/0055859 A1 | 2/2016 | Finlow-Bates |
| 2016/0080867 A1 | 3/2016 | Nugent |
| 2016/0088392 A1 | 3/2016 | Huttunen |
| 2016/0100092 A1 | 4/2016 | Bohac |
| 2016/0105473 A1 | 4/2016 | Klingbeil |
| 2016/0111109 A1 | 4/2016 | Tsujikawa |
| 2016/0127527 A1 | 5/2016 | Mani |
| 2016/0134928 A1 | 5/2016 | Ogle |
| 2016/0142548 A1 | 5/2016 | Pandey |
| 2016/0142814 A1 | 5/2016 | Deroo |
| 2016/0142815 A1 | 5/2016 | Norris |
| 2016/0148057 A1 | 5/2016 | Oh |
| 2016/0150315 A1 | 5/2016 | Tzirkel-Hancock |
| 2016/0150316 A1 | 5/2016 | Kubota |
| 2016/0155455 A1 | 6/2016 | Ojanperä |
| 2016/0161588 A1 | 6/2016 | Benattar |
| 2016/0165339 A1 | 6/2016 | Benattar |
| 2016/0165340 A1 | 6/2016 | Benattar |
| 2016/0165341 A1 | 6/2016 | Benattar |
| 2016/0173976 A1 | 6/2016 | Podhradsky |
| 2016/0173978 A1 | 6/2016 | Li |
| 2016/0189727 A1 | 6/2016 | Wu |
| 2016/0192068 A1 | 6/2016 | Ng |
| 2016/0196836 A1 | 7/2016 | Yu |
| 2016/0234593 A1 | 8/2016 | Matsumoto |
| 2016/0245698 A1 | 8/2016 | Pau |
| 2016/0249132 A1 | 8/2016 | Oliaei |
| 2016/0275961 A1 | 9/2016 | Yu |
| 2016/0295279 A1 | 10/2016 | Srinivasan |
| 2016/0300584 A1 | 10/2016 | Pandey |
| 2016/0302002 A1 | 10/2016 | Lambert |
| 2016/0302006 A1 | 10/2016 | Pandey |
| 2016/0323667 A1 | 11/2016 | Shumard |
| 2016/0323668 A1 | 11/2016 | Abraham |
| 2016/0330545 A1 | 11/2016 | Mcelveen |
| 2016/0337523 A1 | 11/2016 | Pandey |
| 2016/0353200 A1 | 12/2016 | Bigeh |
| 2016/0357508 A1 | 12/2016 | Moore |
| 2017/0019744 A1 | 1/2017 | Matsumoto |
| 2017/0064451 A1 | 3/2017 | Park |
| 2017/0105066 A1 | 4/2017 | Mclaughlin |
| 2017/0134849 A1 | 5/2017 | Pandey |
| 2017/0134850 A1 | 5/2017 | Graham |
| 2017/0164101 A1 | 6/2017 | Rollow, IV |
| 2017/0180861 A1 | 6/2017 | Chen |
| 2017/0206064 A1 | 7/2017 | Breazeal |
| 2017/0230748 A1 | 8/2017 | Shumard |
| 2017/0264999 A1 | 9/2017 | Fukuda |
| 2017/0303887 A1 | 10/2017 | Richmond |
| 2017/0308352 A1 | 10/2017 | Kessler |
| 2017/0374454 A1 | 12/2017 | Bernardini |
| 2018/0083848 A1 | 3/2018 | Siddiqi |
| 2018/0102135 A1 | 4/2018 | Ebenezer |
| 2018/0102136 A1 | 4/2018 | Ebenezer |
| 2018/0109873 A1 | 4/2018 | Xiang |
| 2018/0115799 A1 | 4/2018 | Thiele |
| 2018/0160224 A1 | 6/2018 | Graham |
| 2018/0196585 A1 | 7/2018 | Densham |
| 2018/0219922 A1 | 8/2018 | Bryans |
| 2018/0227666 A1 | 8/2018 | Barnett |
| 2018/0292079 A1 | 10/2018 | Branham |
| 2018/0310096 A1 | 10/2018 | Shumard |
| 2018/0313558 A1 | 11/2018 | Byers |
| 2018/0338205 A1 | 11/2018 | Abraham |
| 2018/0359565 A1 | 12/2018 | Kim |
| 2019/0042187 A1 | 2/2019 | Truong |
| 2019/0082249 A1 | 3/2019 | Kim |
| 2019/0124462 A1 | 4/2019 | Lindahl |
| 2019/0166424 A1 | 5/2019 | Harney |
| 2019/0182607 A1 | 6/2019 | Pedersen |
| 2019/0215540 A1 | 7/2019 | Nicol |
| 2019/0230436 A1 | 7/2019 | Tsingos |
| 2019/0259408 A1 | 8/2019 | Freeman |

| | | |
|---|---|---|
| 2019/0268683 A1 | 8/2019 | Miyahara |
| 2019/0295540 A1 | 9/2019 | Grima |
| 2019/0295569 A1 | 9/2019 | Wang |
| 2019/0297422 A1 | 9/2019 | Anderson |
| 2019/0297542 A1 | 9/2019 | Tang |
| 2019/0319677 A1 | 10/2019 | Hansen |
| 2019/0371354 A1 | 12/2019 | Lester |
| 2019/0373362 A1 | 12/2019 | Ansai |
| 2019/0385629 A1 | 12/2019 | Moravy |
| 2019/0387311 A1 | 12/2019 | Schultz |
| 2020/0015021 A1 | 1/2020 | Leppanen |
| 2020/0021910 A1 | 1/2020 | Rollow, IV |
| 2020/0027472 A1 | 1/2020 | Huang |
| 2020/0037068 A1 | 1/2020 | Barnett |
| 2020/0068297 A1 | 2/2020 | Rollow, IV |
| 2020/0100009 A1 | 3/2020 | Lantz |
| 2020/0100025 A1 | 3/2020 | Shumard |
| 2020/0107137 A1 | 4/2020 | Koutrouli |
| 2020/0137485 A1 | 4/2020 | Yamakawa |
| 2020/0145753 A1 | 5/2020 | Rollow, IV |
| 2020/0152218 A1 | 5/2020 | Kikuhara |
| 2020/0162618 A1 | 5/2020 | Enteshari |
| 2020/0228663 A1 | 7/2020 | Wells-Rutherford |
| 2020/0251119 A1 | 8/2020 | Yang |
| 2020/0275204 A1 | 8/2020 | Labosco |
| 2020/0278043 A1 | 9/2020 | Cao |
| 2020/0288237 A1 | 9/2020 | Abraham |
| 2021/0012789 A1 | 1/2021 | Husain |
| 2021/0021940 A1 | 1/2021 | Petersen |
| 2021/0044881 A1 | 2/2021 | Lantz |
| 2021/0051397 A1 | 2/2021 | Veselinovic |
| 2021/0098014 A1 | 4/2021 | Tanaka |
| 2021/0098015 A1 | 4/2021 | Pandey |
| 2021/0120335 A1 | 4/2021 | Veselinovic |
| 2021/0200504 A1 | 7/2021 | Park |
| 2021/0243522 A1 | 8/2021 | Rollow, IV |
| 2021/0263126 A1 | 8/2021 | Arai |
| 2021/0375298 A1 | 12/2021 | Zhang |
| 2022/0369028 A1 | 11/2022 | Abraham |
| 2024/0171685 A1* | 5/2024 | Satomi .................. H04M 9/082 |

FOREIGN PATENT DOCUMENTS

| | | |
|---|---|---|
| CA | 2359771 | 4/2003 |
| CA | 2475283 | 1/2005 |
| CA | 2505496 | 10/2006 |
| CA | 2838856 | 12/2012 |
| CA | 2846323 | 9/2014 |
| CN | 1204425 | 1/1999 |
| CN | 1780495 | 5/2006 |
| CN | 101217830 | 7/2008 |
| CN | 101388213 | 3/2009 |
| CN | 101833954 | 9/2010 |
| CN | 101860776 | 10/2010 |
| CN | 101894558 | 11/2010 |
| CN | 102646418 | 8/2012 |
| CN | 102821336 | 12/2012 |
| CN | 102833664 | 12/2012 |
| CN | 102860039 | 1/2013 |
| CN | 104036784 | 9/2014 |
| CN | 104053088 | 9/2014 |
| CN | 104080289 A1 | 10/2014 |
| CN | 104347076 | 2/2015 |
| CN | 104581463 | 4/2015 |
| CN | 105355210 | 2/2016 |
| CN | 105513596 | 4/2016 |
| CN | 105548998 | 5/2016 |
| CN | 106162427 | 11/2016 |
| CN | 106233751 | 12/2016 |
| CN | 106251857 | 12/2016 |
| CN | 106851036 | 6/2017 |
| CN | 107205196 | 9/2017 |
| CN | 107221336 | 9/2017 |
| CN | 107534725 | 1/2018 |
| CN | 108172235 | 6/2018 |
| CN | 109087664 | 12/2018 |
| CN | 208190895 | 12/2018 |
| CN | 109727604 | 5/2019 |
| CN | 110010147 | 7/2019 |

(56)         References Cited

FOREIGN PATENT DOCUMENTS

| | | |
|---|---|---|
| CN | 306391029 | 3/2021 |
| DE | 2941485 | 4/1981 |
| EM | 0077546430001 | 3/2020 |
| EP | 0381498 | 8/1990 |
| EP | 0594098 | 4/1994 |
| EP | 0869697 | 10/1998 |
| EP | 1180914 | 2/2002 |
| EP | 1184676 | 3/2002 |
| EP | 0944228 | 6/2003 |
| EP | 1439526 | 7/2004 |
| EP | 1651001 | 4/2006 |
| EP | 1727344 | 11/2006 |
| EP | 1906707 | 4/2008 |
| EP | 1952393 | 8/2008 |
| EP | 1962547 | 8/2008 |
| EP | 2133867 | 12/2009 |
| EP | 2159789 | 3/2010 |
| EP | 2197219 | 6/2010 |
| EP | 2360940 | 8/2011 |
| EP | 2710788 | 3/2014 |
| EP | 2721837 | 4/2014 |
| EP | 2772910 | 9/2014 |
| EP | 2778310 | 9/2014 |
| EP | 2802157 | 11/2014 |
| EP | 2942975 | 11/2015 |
| EP | 2988527 | 2/2016 |
| EP | 3035556 | 6/2016 |
| EP | 3131311 | 2/2017 |
| GB | 2393601 | 3/2004 |
| GB | 2446620 | 8/2008 |
| GB | 2512155 | 9/2014 |
| GB | 2563857 | 1/2019 |
| JP | S63144699 | 6/1988 |
| JP | H01260967 | 10/1989 |
| JP | H0241099 | 2/1990 |
| JP | H05260589 | 10/1993 |
| JP | H07336790 | 12/1995 |
| JP | 2518823 | 7/1996 |
| JP | 3175622 | 6/2001 |
| JP | 2003060530 | 2/2003 |
| JP | 2003087890 | 3/2003 |
| JP | 2004349806 | 12/2004 |
| JP | 2004537232 | 12/2004 |
| JP | 2005323084 | 11/2005 |
| JP | 2006067127 | 3/2006 |
| JP | 2006094389 | 4/2006 |
| JP | 2006101499 | 4/2006 |
| JP | 2006148330 | 6/2006 |
| JP | 4120646 | 8/2006 |
| JP | 4258472 | 8/2006 |
| JP | 4196956 | 9/2006 |
| JP | 2006340151 | 12/2006 |
| JP | 4760160 | 1/2007 |
| JP | 4752403 | 3/2007 |
| JP | 2007089058 | 4/2007 |
| JP | 4867579 | 6/2007 |
| JP | 2007208503 | 8/2007 |
| JP | 2007228069 | 9/2007 |
| JP | 2007228070 | 9/2007 |
| JP | 2007274131 | 10/2007 |
| JP | 2007274463 | 10/2007 |
| JP | 2007288679 | 11/2007 |
| JP | 2008005347 | 1/2008 |
| JP | 2008042754 | 2/2008 |
| JP | 2008154056 | 7/2008 |
| JP | 2008259022 | 10/2008 |
| JP | 2008263336 | 10/2008 |
| JP | 2008312002 | 12/2008 |
| JP | 2009206671 | 9/2009 |
| JP | 2010028653 | 2/2010 |
| JP | 2010114554 | 5/2010 |
| JP | 2010268129 | 11/2010 |
| JP | 2011015018 | 1/2011 |
| JP | 4779748 | 9/2011 |
| JP | 2012165189 | 8/2012 |
| JP | 5028944 | 9/2012 |
| JP | 5139111 | 2/2013 |
| JP | 5306565 | 10/2013 |
| JP | 5685173 | 3/2015 |
| JP | 2016051038 | 4/2016 |
| KR | 100298300 | 5/2001 |
| KR | 20040083109 | 1/2004 |
| KR | 100901464 | 6/2009 |
| KR | 100960781 | 6/2010 |
| KR | 1020130033723 | 4/2013 |
| KR | 300856915 | 5/2016 |
| TW | 201331932 | 8/2013 |
| TW | 201347404 | 11/2013 |
| TW | I484478 | 5/2015 |
| TW | 201643688 | 12/2016 |
| TW | 201728075 | 8/2017 |
| TW | 201908761 | 3/2019 |
| WO | 1997008896 | 3/1997 |
| WO | 1998047291 | 10/1998 |
| WO | 2000030402 | 5/2000 |
| WO | 2003073786 | 9/2003 |
| WO | 2003088429 | 10/2003 |
| WO | 2004027754 | 4/2004 |
| WO | 2004090865 | 10/2004 |
| WO | 2006049260 | 5/2006 |
| WO | 2006071119 | 7/2006 |
| WO | 2006114015 | 11/2006 |
| WO | 2006121896 | 11/2006 |
| WO | 2007045971 | 4/2007 |
| WO | 2007052269 | 5/2007 |
| WO | 2007090010 | 8/2007 |
| WO | 2008074249 | 6/2008 |
| WO | 2008125523 | 10/2008 |
| WO | 2009039783 | 4/2009 |
| WO | 2009109069 | 9/2009 |
| WO | 2010001508 | 1/2010 |
| WO | 2010091999 | 8/2010 |
| WO | 2010140084 | 12/2010 |
| WO | 2010144148 | 12/2010 |
| WO | 2011104501 | 9/2011 |
| WO | 2012122132 | 9/2012 |
| WO | 2012140435 | 10/2012 |
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | 2020168873 | 8/2020 |
| WO | 2020191354 | 9/2020 |
| WO | 211843001 | 11/2020 |

OTHER PUBLICATIONS

Oh, et al., "Hands-Free Voice Communication in an Automobile With a Microphone Array," 1992 IEEE International Conference on Acoustics, Speech, and Signal Processing, Mar. 1992, pp. I-281-I-284.

Olszewski, et al., "Steerable Highly Directional Audio Beam Loudspeaker," Interspeech 2005, 4 pp.

Omologo, Multi-Microphone Signal Processing for Distant-Speech Interaction, Human Activity and Vision Summer School (HAVSS), Inria Sophia Antipolis, Oct. 3, 2012, 79 pgs.

Order, Conduct of the Proceeding, *Clearone, Inc.* v. *Shure Acquisition Holdings, Inc.*, Nov. 2, 2020, 10 pp.

Pados et al., An Iterative Algorithm for the Computation of the MVDR Filter, IEEE Trans. On Signal Processing, vol. 49, No. 2, Feb. 2001, pp. 290-300.

Palladino, "This App Lets You Control Your Smarthome Lights via Augmented Reality," Next Reality Mobile AR News, Jul. 2, 2018, 5 pp.

(56) References Cited

OTHER PUBLICATIONS

Parikh, et al., "Methods for Mitigating IP Network Packet Loss in Real Time Audio Streaming Applications," GatesAir, 2014, 6 pp.

Pasha, et al., "Clustered Multi-channel Dereverberation for Ad-hoc Microphone Arrays," Proceedings of APSIPA Annual Summit and Conference, Dec. 2015, pp. 274-278.

Petitioner's Motion for Sanctions, *Clearone, Inc.* v. *Shure Acquisition Holdings, Inc.*, Aug. 24, 2020, 20 pp.

Pettersen, "Broadcast Applications for Voice-Activated Microphones," db, Jul./Aug. 1985, 6 pgs.

Pfeifenberger, et al., "Nonlinear Residual Echo Suppression using a Recurrent Neural Network," Interspeech 2020, 5 pp.

Phoenix Audio Technologies, "Beamforming and Microphone Arrays—Common Myths", Apr. 2016, http://info.phnxaudio.com/blog/microphone-arrays-beamforming-myths-1, 19 pp.

Plascore, PCGA-XR1 3003 Aluminum Honeycomb Data Sheet, 2008, 2 pgs.

Polycom Inc., Vortex EF2211/EF2210 Reference Manual, 2003, 66 pgs.

Polycom, Inc., Polycom SoundStructure C16, C12, C8, and SR12 Design Guide, Nov. 2013, 743 pgs.

Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.

Polycom, Inc., Vortex EF2241 Reference Manual, 2002, 68 pgs.

Polycom, Inc., Vortex EF2280 Reference Manual, 2001, 60 pp.

Pomona, Model 3306, Datasheet, Jun. 9, 1999, 1 p.

Powers, et al., "Proving Adaptive Directional Technology Works: A Review of Studies," The Hearing Review, Apr. 6, 2004, 5 pp.

Prime, et al., "Beamforming Array Optimisation Averaged Sound Source Mapping on a Model Wind Turbine," ResearchGate, Nov. 2014, 10 pp.

Rabinkin et al., Estimation of Wavefront Arrival Delay Using the Cross-Power Spectrum Phase Technique, 132nd Meeting of the Acoustical Society of America, Dec. 1996, pp. 1-10.

Rane Corp., Halogen Acoustic Echo Cancellation Guide, AEC Guide Version 2, Nov. 2013, 16 pgs.

Rao, et al., "Fast LMS/Newton Algorithms for Stereophonic Acoustic Echo Cancelation," IEEE Transactions on Signal Processing, vol. 57, No. 8, Aug. 2009. 12 pages.

Reuven et al., Joint Acoustic Echo Cancellation and Transfer Function GSC in the Frequency Domain, 23rd IEEE Convention of Electrical and Electronics Engineers in Israel, Sep. 2004, pp. 412-415.

Reuven et al., Joint Noise Reduction and Acoustic Echo Cancellation Using the Transfer-Function Generalized Sidelobe Canceller, Speech Communication, vol. 49, 2007, pp. 623-635.

Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.

Ristimaki, Distributed Microphone Array System for Two-Way Audio Communication, Helsinki Univ. of Technology, Master's Thesis, Jun. 15, 2009, 73 pgs.

Rombouts et al., An Integrated Approach to Acoustic Noise and Echo Cancellation, Signal Processing 85, 2005, pp. 849-871.

Sällberg, "Faster Subband Signal Processing," IEEE Signal Processing Magazine, vol. 30, No. 5, Sep. 2013, 6 pp.

Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.

Sennheiser, New microphone solutions for ceiling and desk installation, https://en-us.sennheiser.com/news-new-microphone-solutions-for-ceiling-and-desk-installation, Feb. 2011, 2 pgs.

Sennheiser, TeamConnect Ceiling, https://en-us.sennheiser.com/conference-meeting-rooms-teamconnect-ceiling, 2017, 7 pgs.

SerDes, Wikipedia article, last edited on Jun. 25, 2018; retrieved on Jun. 27, 2018, 3 pp., https://en.wikipedia.org/wiki/SerDes.

Sessler, et al., "Directional Transducers," IEEE Transactions on Audio and Electroacoustics, vol. AU-19, No. 1, Mar. 1971, pp. 19-23.

Sessler, et al., "Toroidal Microphones," Journal of Acoustical Society of America, vol. 46, No. 1, 1969, 10 pp.

Shure AMS Update, vol. 1, No. 1, 1983, 2 pgs.

Shure AMS Update, vol. 4, No. 4, 1997, 8 pgs.

Shure Debuts Microflex Advance Ceiling and Table Array Microphones, Press Release, Feb. 9, 2016, 4 pp.

Shure Inc., A910-HCM Hard Ceiling Mount, retrieved from website <http://www.shure.com/en-US/products/accessories/a910hcm> on Jan. 16, 2020, 3 pp.

Shure Inc., Microflex Advance, http://www.shure.com/americas/microflex-advance, 12 pgs.

Shure Inc., MX395 Low Profile Boundary Microphones, 2007, 2 pgs.

Shure Inc., MXA910 Ceiling Array Microphone, http://www.shure.com/americas/products/microphones/microflex-advance/mxa910-ceiling-array-microphone, 7 pp. 2009-2017.

Shure, MXA910 With IntelliMix, Ceiling Array Microphone, available at <https://www.shure.com/en-US/products/microphones/mxa910>, as early as 2020, 12 pp.

Shure, New MXA910 Variant Now Available, Press Release, Dec. 13, 2019, 5 pp.

Shure, Q&A in Response to Recent Us Court Ruling on Shure MXA910, Available at <https://www.shure.com/en-US/meta/legal/q-and-a-inresponse-to-recent-us-court-ruling-on-shure-mxa910-response>, As early as 2020, 5 pp.

Shure, RK244G Replacement Screen and Grille, Datasheet, 2013, 1 p.

Shure, The Microflex Advance MXA310 Table Array Microphone, Available at <https://www.shure.com/en-US/products/microphones/mxa310>, As early as 2020, 12 pp.

Signal Processor MRX7-D Product Specifications, Yamaha Corporation, 2016. 12 pages.

Invensense, Recommendations for Mounting and Connecting InvenSense MEMS Microphones, Application Note AN-1003, 2013, 11 pp.

Invitation to Pay Additional Fees for PCT/US2022/045694 dated Jan. 24, 2023, 13 pp.

Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.

Ito et al., Aerodynamic/Aeroacoustic Testing in Anechoic Closed Test Sections of Low-speed Wind Tunnels, 16th AIAA/CEAS Aeroacoustics Conference, 2010, 11 pgs.

Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.

Johansson, et al., Speaker Localisation using the Far-Field SRP-PHAT in Conference Telephony, 2002 International Symposium on Intelligent Signal Processing and Communication Systems, 5 pgs.

Johnson, et al., "Array Signal Processing: Concepts and Techniques," p. 59, Prentice Hall, 1993, 3 pp.

Julstrom et al., Direction-Sensitive Gating: A New Approach to Automatic Mixing, J. Audio Eng. Soc., vol. 32, No. 7/8, Jul./Aug. 1984, pp. 490-506.

Kahrs, Ed., The Past, Present, and Future of Audio Signal Processing, IEEE Signal Processing Magazine, Sep. 1997, pp. 30-57.

Kallinger et al., Multi-Microphone Residual Echo Estimation, 2003 IEEE International Conference on Acoustics, Speech, and Signal Processing, Apr. 2003, 4 pgs.

Kammeyer, et al., New Aspects of Combining Echo Cancellers with Beamformers, IEEE International Conference on Acoustics, Speech, and Signal Processing, Mar. 2005, pp. III-137-III-140.

Kellermann, A Self-Steering Digital Microphone Array, 1991 International Conference on Acoustics, Speech, and Signal Processing, Apr. 1991, pp. 3581-3584.

(56) References Cited

OTHER PUBLICATIONS

Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.

Kellermann, Integrating Acoustic Echo Cancellation with Adaptive Beamforming Microphone Arrays, Forum Acusticum, Berlin, Mar. 1999, pp. 1-4.

Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.

Klegon, "Achieve Invisible Audio with the MXA910 Ceiling Array Microphone," Jun. 27, 2016, 10 pp.

Knapp, et al., The Generalized Correlation Method for Estimation of Time Delay, IEEE Transactions on Acoustics, Speech, and Signal Processing, vol. ASSP-24, No. 4, Aug. 1976, pp. 320-327.

Kobayashi et al., A Hands-Free Unit with Noise Reduction by Using Adaptive Beamformer, IEEE Transactions on Consumer Electronics, vol. 54, No. 1, Feb. 2008, pp. 116-122.

Kobayashi et al., A Microphone Array System with Echo Canceller, Electronics and Communications in Japan, Part 3, vol. 89, No. 10, Feb. 2, 2006, pp. 23-32.

Kolundžija, et al., "Baffled circular loudspeaker array with broadband high directivity," 2010 IEEE International Conference on Acoustics, Speech and Signal Processing, Dallas, TX, 2010, pp. 73-76.

Lai, et al., "Design of Robust Steerable Broadband Beamformers with Spiral Arrays and the Farrow Filter Structure," Proc. Intl. Workshop Acoustic Echo Noise Control, 2010, 4 pp.

Lebret, et al., Antenna Array Pattern Synthesis via Convex Optimization, IEEE Trans. on Signal Processing, vol. 45, No. 3, Mar. 1997, pp. 526-532.

LecNet2 Sound System Design Guide, Lectrosonics, Jun. 2, 2006. 28 pages.

Lectrosonics, LecNet2 Sound System Design Guide, Jun. 2006, 28 pgs.

Lee et al., Multichannel Teleconferencing System with Multispatial Region Acoustic Echo Cancellation, International Workshop on Acoustic Echo and Noise Control (IWAENC2003), Sep. 2003, pp. 51-54.

Li, "Broadband Beamforming and Direction Finding Using Concentric Ring Array," Ph. D. Dissertation, University of Missouri—Columbia, Jul. 2005, 163 pp.

Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.

Liu et al., Adaptive Beamforming with Sidelobe Control: A Second-Order Cone Programming Approach, IEEE Signal Proc. Letters, vol. 10, No. 11, Nov. 2003, pp. 331-334.

Liu, et al., "Frequency Invariant Beamforming in Subbands," IEEE Conference on Signals, Systems and Computers, 2004, 5 pp.

Liu, et al., "Wideband Beamforming," Wiley Series on Wireless Communications and Mobile Computing, pp. 143-198, 2010, 297 pp.

Lobo, et al., Applications of Second-Order Cone Programming, Linear Algebra and its Applications 284, 1998, pp. 193-228.

Luo et al., Wideband Beamforming with Broad Nulls of Nested Array, Third Int'l Conf. on Info. Science and Tech., Mar. 23-25, 2013, pp. 1645-1648.

Marquardt et al., A Natural Acoustic Front-End for Interactive TV in the EU-Project Dicit, IEEE Pacific Rim Conference on Communications, Computers and Signal Processing, Aug. 2009, pp. 894-899.

Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.

Maruo et al., On the Optimal Solutions of Beamformer Assisted Acoustic Echo Cancellers, IEEE Statistical Signal Processing Workshop, 2011, pp. 641-644.

Matheja, et al., "Dynamic Signal Combining for Distributed Microphone Systems in Car Environments," 2011 IEEE International Conference on Acoustics, Speech and Signal Processing, May 22, 2011, 6 pp.

McCowan, Microphone Arrays: A Tutorial, Apr. 2001, 36 pgs.

MFLCRFG Datasheet, Metal_Fab Inc., Sep. 7, 2007, 1 p.

Microphone Array Primer, Shure Question and Answer Page, <https://service.shure.com/s/article/microphone-array-primer?language=en_US>, Jan. 2019, 5 pp.

Milanovic, et al., "Design and Realization of FPGA Platform for Real Time Acoustic Signal Acquisition and Data Processing" 22nd Telecommunications Forum TELFOR, 2014, 6 pp.

Mohammed, A New Adaptive Beamformer for Optimal Acoustic Echo and Noise Cancellation with Less Computational Load, Canadian Conference on Electrical and Computer Engineering, May 2008, pp. 000123-000128.

Mohammed, A New Robust Adaptive Beamformer for Enhancing Speech Corrupted with Colored Noise, AICCSA, Apr. 2008, pp. 508-515.

Mohammed, Real-time Implementation of an efficient RLS Algorithm based on IIR Filter for Acoustic Echo Cancellation, AICCSA, Apr. 2008, pp. 489-494.

Mohan, et al., "Localization of multiple acoustic sources with small arrays using a coherence test," Journal Acoustic Soc Am., 123(4), Apr. 2008, 12 pp.

Moulines, et al., "Pitch-Synchronous Waveform Processing Techniques for Text-to-Speech Synthesis Using Diphones," Speech Communication 9, 1990, 15 pp.

Multichannel Acoustic Echo Cancellation, Obtained from website http://www.buchner-net.com/mcaec.html, Jun. 2011. 3 pages.

Myllyla et al., Adaptive Beamforming Methods for Dynamically Steered Microphone Array Systems, 2008 IEEE International Conference on Acoustics, Speech and Signal Processing, Mar.-Apr. 2008, pp. 305-308.

New Shure Microflex Advance MXA910 Microphone With Intellimix Audio Processing Provides Greater Simplicity, Flexibility, Clarity, Press Release, Jun. 12, 2019, 4 pp.

Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.

Office Action for Taiwan Patent Application No. 105109900 dated May 5, 2017. 10 pages.

Buck, et al., "Self-Calibrating Microphone Arrays for Speech Signal Acquisition: A Systematic Approach," Signal Processing, vol. 86, 2006, pp. 1230-1238.

Burton, et al., "A New Structure for Combining Echo Cancellation and Beamforming in Changing Acoustical Environments," IEEE International Conference on Acoustics, Speech and Signal Processing, 2007, pp. 1-77-1-80.

BZ-3a Installation Instructions, XEDIT Corporation, Available at <chrome-extension://efaidnbmnnnibpcajpcglclefindmkaj/viewer. html?pdfurl=https%3A%2F%2Fwww.servoreelers.com%2Fmt-content%2Fuploads%2F2017%2F05%2Fbz-a-3universal-2017c.pdf &clen=189067&chunk=true>, 1 p.

Cabral, et al., Glottal Spectral Separation for Speech Synthesis, IEEE Journal of Selected Topics in Signal Processing, 2013, 15 pp.

Campbell, "Adaptive Beamforming Using a Microphone Array for Hands-Free Telephony," Virginia Polytechnic Institute and State University, Feb. 1999, 154 pgs.

Canetto, et al., "Speech Enhancement Systems Based on Microphone Arrays," VI Conference of the Italian Society for Applied and Industrial Mathematics, May 27, 2002, 9 pp.

Cao, "Survey on Acoustic Vector Sensor and its Applications in Signal Processing" Proceedings of the 33rd Chinese Control Conference, Jul. 2014, 17 pp.

Cech, et al., "Active-Speaker Detection and Localization with Microphones and Cameras Embedded into a Robotic Head," IEEE-RAS International Conference on Humanoid Robots, Oct. 2013, pp. 203-210.

(56)             References Cited

OTHER PUBLICATIONS

Chan, et al., "Uniform Concentric Circular Arrays with Frequency-Invariant Characteristics-Theory, Design, Adaptive Beamforming and DOA Estimation," IEEE Transactions on Signal Processing, vol. 55, No. 1, Jan. 2007, pp. 165-177.

Chau, et al., "A Subband Beamformer on an Ultra Low-Power Miniature DSP Platform," 2002 IEEE International Conference on Acoustics, Speech, and Signal Processing, 4 pp.

Chen, et al., "A General Approach to the Design and Implementation of Linear Differential Microphone Arrays," Signal and Information Processing Association Annual Summit and Conference, 2013 Asia-Pacific, IEEE, 7 pp.

Chen, et al., "Design and Implementation of Small Microphone Arrays," PowerPoint Presentation, Northwestern Polytechnical University and Institut national de la recherche scientifique, Jan. 1, 2014, 56 pp.

Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.

Chou, "Frequency-Independent Beamformer with Low Response Error," 1995 International Conference on Acoustics, Speech, and Signal Processing, pp. 2995-2998, May 9, 1995, 4 pp.

Chu, "Desktop Mic Array for Teleconferencing," 1995 International Conference on Acoustics, Speech, and Signal Processing, May 1995, pp. 2999-3002.

Circuit Specialists webpage for an aluminum enclosure, available at <https://www.circuitspecialists.com/metal-instrument-enclosure-la7.html?otaid=gpl&gclid=EAlalQobChMI2JTw-Ynm6AlVgbblCh3F4QKuEAkYBiABEgJZMPD_BWE>, 3 pp, 2019.

ClearOne Introduces Ceiling Microphone Array With Built-In Dante Interface, Press Release; GlobeNewswire, Jan. 8, 2019, 2 pp.

ClearOne Launches Second Generation of its Groundbreaking Beamforming Microphone Array, Press Release, Acquire Media, Jun. 1, 2016, 2 pp.

ClearOne to Unveil Beamforming Microphone Array with Adaptive Steering and Next Generation Acoustic Echo Cancellation Technology, Press Release, InfoComm, Jun. 4, 2012, 1 p.

ClearOne, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.

ClearOne, Beamforming Microphone Array, Mar. 2012, 6 pgs.

ClearOne, Ceiling Microphone Array Installation Manual, Jan. 9, 2012, 20 pgs.

ClearOne, Converge/Converge Pro, Manual, 2008, 51 pp.

ClearOne, Professional Conferencing Microphones, Brochure, Mar. 2015, 3 pp.

Coleman, "Loudspeaker Array Processing for Personal Sound Zone Reproduction," Centre for Vision, Speech and Signal Processing, 2014, 239 pp.

Cook, et al., An Alternative Approach to Interpolated Array Processing for Uniform Circular Arrays, Asia-Pacific Conference on Circuits and Systems, 2002, pp. 411-414.

Cox, et al., "Robust Adaptive Beamforming," IEEE Trans. Acoust., Speech, and Signal Processing, vol. ASSP-35, No. 10, Oct. 1987, pp. 1365-1376.

CTG Audio, Ceiling Microphone CTG CM-01, Jun. 5, 2008, 2 pgs.

CTG Audio, CM-01 & CM-02 Ceiling Microphones Specifications, 2 pgs.

CTG Audio, CM-01 & CM-02 Ceiling Microphones, 2017, 4 pgs.

CTG Audio, CTG FS-400 and RS-800 with "Beamforming" Technology, Datasheet, As early as 2009, 2 pp.

CTG Audio, CTG User Manual for the FS-400/800 Beamforming Mixers, Nov. 2008, 26 pp.

CTG Audio, Expand Your IP Teleconferencing to Full Room Audio, Obtained from website htt. )://www ct audio com/exand-, our-i-teleconforencino-to-ful-room-audio-while-conquennc.1-echo-cancelation-issues Mull, 2014. 3 pages.

CTG Audio, Frequently Asked Questions, As early as 2009, 2 pp.

CTG Audio, Installation Manual and User Guidelines for the Soundman SM 02 System, May 2001, 29 pp.

CTG Audio, Installation Manual, Nov. 21, 2008, 25 pgs.

CTG Audio, Introducing the CTG FS-400 and FS-800 with Beamforming Technology, As early as 2008, 2 pp.

CTG Audio, Meeting the Demand for Ceiling Mics in the Enterprise 5 Best Practices, Brochure, 2012, 9 pp.

CTG Audio, White on White—Introducing the CM-02 Ceiling Microphone, https://ctgaudio.com/white-on-white-introducing-the-cm-02-ceiling-microphone/, Feb. 20, 2014, 3 pgs.

Dahl et al., Acoustic Echo Cancelling with Microphone Arrays, Research Report 3/95, Univ. of Karlskrona/Ronneby, Apr. 1995, 64 pgs.

Decawave, Application Note: APR001, UWB Regulations, A Summary of Worldwide Telecommunications Regulations governing the use of Ultra-Wideband radio, Version 1.2, 2015, 63 pp.

Desiraju, et al., "Efficient Multi-Channel Acoustic Echo Cancellation Using Constrained Sparse Filter Updates in the Subband Domain," Acoustic Speech Enhancement Research, Sep. 2014, 4 pp.

DiBiase et al., Robust Localization in Reverberent Rooms, in Brandstein, ed., Microphone Arrays: Techniques and Applications, 2001, Springer-Verlag Berlin Heidelberg, pp. 157-180.

Diethorn, "Audio Signal Processing for Next-Generation Multimedia Communication Systems," Chapter 4, 2004, 9 pp.

Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAlalQobChMI2JTw-Ynm6AlVgbblCh3F4QKuEAkYCSABEgKybPD_BWE>, 3 pp.

Digikey webpage for Pomona Box (last visited Apr. 22, 2020) available at <https://www.digikey.com/product-detail/en/pomonaelectronics/3306/501-2054-ND/736489>, 2 pp.

Digital Wireless Conference System, MCW-D 50, Beyerdynamic Inc., 2009, 18 pp.

Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. I-121-I-124.

Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.

Dormehl, "HoloLens concept lets you control your smart home via augmented reality," digitaltrends, Jul. 26, 2016, 12 pp.

Silverman et al., Performance of Real-Time Source-Location Estimators for a Large-Aperture Microphone Array, IEEE Transactions on Speech and Audio Processing, vol. 13, No. 4, Jul. 2005, pp. 593-606.

Sinha, Ch. 9: Noise and Echo Cancellation, in Speech Processing in Embedded Systems, Springer, 2010, pp. 127-142.

SM 69 Stereo Microphone, Datasheet, Georg Neumann GmbH, Available at <https://ende.neumann.com/product_files/6552/download>, 1 p.

Soda et al., Introducing Multiple Microphone Arrays for Enhancing Smart Home Voice Control, The Institute of Electronics, Information and Communication Engineers, Technical Report of IEICE, Jan. 2013, 6 pgs.

Soundweb London Application Guides, BSS Audio, 2010. 120 pgs.

Symetrix, Inc., SymNet Network Audio Solutions Brochure, 2008, 32 pgs.

Tan, et al., "Pitch Detection Algorithm: Autocorrelation Method and AMDF," Department of Computer Engineering, Prince of Songkhla University, Jan. 2003, 6 pp.

Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.

(56)                    References Cited

OTHER PUBLICATIONS

Tetelbaum et al., Design and Implementation of a Conference Phone Based on Microphone Array Technology, Proc. Global Signal Processing Conference and Expo (GSPx), Sep. 2004, 6 pgs.

Tiete et al., SoundCompass: A Distributed MEMS Microphone Array-Based Sensor for Sound Source Localization, Sensors, Jan. 23, 2014, pp. 1918-1949.

TOA Corp., Ceiling Mount Microphone AN-9001 Operating Instructions, http://www.toaelectronics.com/media/an9001_mt1e.pdf, 1 pg.

Togami, et al., "Subband Beamformer Combined with Time-Frequency ICA for Extraction of Target Source Under Reverberant Environments," 17th European Signal Processing Conference, Aug. 2009, 5 pp.

U.S. Appl. No. 16/598,918, filed Oct. 10, 2019, 50 pp.

Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.

Van Trees, Optimum Array Processing: Part IV of Detection, Estimation, and Modulation Theory, 2002, 54 pgs., pp. i-xxv, 90-95, 201-230.

Van Veen et al., Beamforming: A Versatile Approach to Spatial Filtering, IEEE ASSP Magazine, vol. 5, issue 2, Apr. 1988, pp. 4-24.

Vicente, "Adaptive Array Signal Processing Using the Concentric Ring Array and the Spherical Array," Ph.D. Dissertation, University of Missouri, May 2009, 226 pp.

Wang et al., Combining Superdirective Beamforming and Frequency-Domain Blind Source Separation for Highly Reverberant Signals, EURASIP Journal on Audio, Speech, and Music Processing, vol. 2010, pp. 1-13.

Warsitz, et al., "Blind Acoustic Beamforming Based on Generalized Eigenvalue Decomposition," IEEE Transactions on Audio, Speech and Language Processing, vol. 15, No. 5, 2007, 11 pp.

Weinstein, et al., "Loud: A 1020-Node Microphone Array and Acoustic Beamformer," 14th International Congress on Sound & Vibration, Jul. 2007, 8 pgs.

Weinstein, et al., "Loud: A 1020-Node Modular Microphone Array and Beamformer for Intelligent Computing Spaces," MIT Computer Science and Artifical Intelligence Laboratory, 2004, 18 pp.

Wung, "A System Approach to Multi-Channel Acoustic Echo Cancellation and Residual Echo Suppression for Robust Hands-Free Teleconferencing," Georgia Institute of Technology, May 2015, 167 pp.

XAP Audio Conferencing Brochure, ClearOne Communications, Inc., 2002. 78 pages.

Yamaha Corp., MRX7-D Signal Processor Product Specifications, 2016, 12 pgs.

Yamaha Corp., PJP-100H IP Audio Conference System Owner's Manual, Sep. 2006, 59 pgs.

Yamaha Corp., PJP-EC200 Conference Echo Canceller Brochure, Oct. 2009, 2 pgs.

Yan et al., Convex Optimization Based Time-Domain Broadband Beamforming with Sidelobe Control, Journal of the Acoustical Society of America, vol. 121, No. 1, Jan. 2007, pp. 46-49.

Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.

Yermeche, et al., "Real-Time DSP Implementation of a Subband Beamforming Algorithm for Dual Microphone Speech Enhancement," 2007 IEEE International Symposium on Circuits and Systems, 4 pp.

Zavarehei, et al., "Interpolation of Lost Speech Segments Using LP-HNM Model with Codebook Post-Processing," IEEE Transactions on Multimedia, vol. 10, No. 3, Apr. 2008, 10 pp.

Zhang, et al., "F-T-LSTM based Complex Network for Joint Acoustic Echo Cancellation and Speech Enhancement," Audio, Speech and Language Processing Group, Jun. 2021, 5 pp.

Zhang, et al., "Multichannel Acoustic Echo Cancelation in Multi-party Spatial Audio Conferencing with Constrained Kalman Filtering," 11th International Workshop on Acoustic Echo and Noise Control, Sep. 14, 2008, 4 pp.

Zhang, et al., "Selective Frequency Invariant Uniform Circular Broadband Beamformer," EURASIP Journal on Advances in Signal Processing, vol. 2010, pp. 1-11.

Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.

Double Condenser Microphone SM 69, Datasheet, Georg Neumann GmbH, available at <https://ende.neumann.com/product_files/7453/download>, 8 pp.

Eargle, "The Microphone Handbook," Elar Publ. Co., 1st ed., 1981, 4 pp.

Enright, Notes From Logan, June edition of Scanlines, Jun. 2009, 9 pp.

Fan, et al., "Localization Estimation of Sound Source by Microphones Array," Procedia Engineering 7, 2010, pp. 312-317.

Firoozabadi, et al., "Combination of Nested Microphone Array and Subband Processing for Multiple Simultaneous Speaker Localization," 6th International Symposium on Telecommunications, Nov. 2012, pp. 907-912.

Flanagan et al., Autodirective Microphone Systems, Acustica, vol. 73, 1991, pp. 58-71.

Flanagan, et al., "Computer-Steered Microphone Arrays for Sound Transduction in Large Rooms," J. Acoust. Soc. Am. 78 (5), Nov. 1985, pp. 1508-1518.

Fohhn Audio New Generation of Beam Steering Systems Available Now, audioXpress Staff, May 10, 2017, 8 pp.

Fox, et al., "A Subband Hybrid Beamforming for In-Car Speech Enhancement," 20th European Signal rocessing Conference, Aug. 2012, 5 pp.

Frost, III, An Algorithm for Linearly Constrained Adaptive Array Processing, Proc. IEEE, vol. 60, No. 8, Aug. 1972, pp. 926-935.

Gannot et al., Signal Enhancement using Beamforming and Nonstationarity with Applications to Speech, IEEE Trans. on Signal Processing, vol. 49, No. 8, Aug. 2001, pp. 1614-1626.

Gansler et al., A Double-Talk Detector Based on Coherence, IEEE Transactions on Communications, vol. 44, No. 11, Nov. 1996, pp. 1421-1427.

Gazor et al., Robust Adaptive Beamforming via Target Tracking, IEEE Transactions on Signal Processing, vol. 44, No. 6, Jun. 1996, pp. 1589-1593.

Gazor et al., Wideband Multi-Source Beamforming with Adaptive Array Location Calibration and Direction Finding, 1995 International Conference on Acoustics, Speech, and Signal Processing, May 1995, pp. 1904-1907.

Gentner Communications Corp., AP400 Audio Perfect 400 Audioconferencing System Installation & Operation Manual, Nov. 1998, 80 pgs.

Gentner Communications Corp., XAP 800 Audio Conferencing System Installation & Operation Manual, Oct. 2001, 152 pgs.

Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.

Giuliani, et al., "Use of Different Microphone Array Configurations for Hands-Free Speech Recognition in Noisy and Reverberant Environment," IRST-Istituto per la Ricerca Scientifica e Tecnologica, Sep. 22, 1997, 4 pp.

Gritton et al., Echo Cancellation Algorithms, IEEE ASSP Magazine, vol. 1, issue 2, Apr. 1984, pp. 30-38.

Hald, et al., "A class of optimal broadband phased array geometries designed for easy construction," 2002 Int'l Congress & Expo. on Noise Control Engineering, Aug. 2002, 6 pp.

Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.

Hayo, Virtual Controls for Real Life, Web page downloaded from https://hayo.io/ on Sep. 18, 2019, 19 pp.

(56) References Cited

OTHER PUBLICATIONS

Herbordt et al., A Real-time Acoustic Human-Machine Front-End for Multimedia Applications Integrating Robust Adaptive Beamformning and Stereophonic Acoustic Echo Cancellation, 7th International Conference on Spoken Language Processing, Sep. 2002, 4 pgs.

Herbordt et al., GSAEC—Acoustic Echo Cancellation embedded into the Generalized Sidelobe Canceller, 10th European Signal Processing Conference, Sep. 2000, 5 pgs.

Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.

Herbordt, "Combination of Robust Adaptive Beamforming with Acoustic Echo Cancellation for Acoustic Human/Machine Interfaces," Friedrich-Alexander University, 2003, 293 pgs.

Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.

Holm, "Optimizing Microphone Arrays for use in Conference Halls," Norwegian University of Science and Technology, Jun. 2009, 101 pp.

Huang et al., Immersive Audio Schemes: The Evolution of Multiparty Teleconferencing, IEEE Signal Processing Magazine, Jan. 2011, pp. 20-32.

ICONYX Gen5, Product Overview; Renkus-Heinz, Dec. 24, 2018, 2 pp.

International Search Report and Written Opinion for PCT/US2016/022773 dated Jun. 10, 2016. 13 pages.

International Search Report and Written Opinion for PCT/US2016/029751 dated Nov. 28, 2016, 21 pp.

International Search Report and Written Opinion for PCT/US2018/013155 dated Jun. 8, 2018. 12 pages.

International Search Report and Written Opinion for PCT/US2018/015269 dated Mar. 26, 2018, 12 pp.

International Search Report and Written Opinion for PCT/US2019/031833 dated Jul. 24, 2019, 16 pp.

International Search Report and Written Opinion for PCT/US2019/033470 dated Jul. 31, 2019, 12 pp.

International Search Report and Written Opinion for PCT/US2019/034692 dated Sep. 10, 2019, 11 pp.

International Search Report and Written Opinion for PCT/US2019/051491 dated Dec. 10, 2019, 13 pp.

International Search Report and Written Opinion for PCT/US2019/051989 dated Jan. 10, 2020, 15 pp.

International Search Report and Written Opinion for PCT/US2020/024063 dated Aug. 31, 2020, 18 pp.

International Search Report and Written Opinion for PCT/US2020/035185 dated Sep. 15, 2020, 11 pp.

International Search Report and Written Opinion for PCT/US2020/058385 dated Mar. 31, 2021, 20 pp.

International Search Report and Written Opinion for PCT/US2021/070625 dated Sep. 17, 2021, 17 pp.

International Search Report and Written Opinion for PCT/US2022/014061 dated May 10, 2022, 14 pp.

International Search Report and Written Opinion for PCT/US2022/045694 dated Mar. 17, 2023, 19 pp.

International Search Report and Written Opinion for PCT/US2022/079056 dated Feb. 17, 2023, 13 pp.

International Search Report and Written Opinion for PCT/US2023/060243 dated Apr. 6, 2023, 13 pp.

International Search Report and Written Opinion for PCT/US2023/075377 dated Feb. 8, 2024, 11 pp.

International Search Report for PCT/US2020/024005 dated Jun. 12, 2020, 12 pp.

InvenSense, "Microphone Array Beamforming," Application Note AN-1140, Dec. 31, 2013, 12 pp.

"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021. 8 pages.

"Vsa 2050 II Digitally Steerable Column Speaker," Web page https://www.rcf.it/en_US/products/product-detail/vsa-2050-ii/972389, 15 pages, Dec. 24, 2018.

Advanced Network Devices, IPSCM Ceiling Tile IP Speaker, Feb. 2011, 2 pgs.

Advanced Network Devices, IPSCM Standard 2' by 2' Ceiling Tile Speaker, 2 pgs.

Affes, et al., "A Signal Subspace Tracking Algorithm for Microphone Array Processing of Speech," IEEE Trans. on Speech and Audio Processing, vol. 5, No. 5, Sep. 1997, pp. 425-437.

Affes, et al., "A Source Subspace Tracking Array of Microphones for Double Talk Situations," 1996 IEEE International Conference on Acoustics, Speech, and Signal Processing Conference Proceedings, May 1996, pp. 909-912.

Affes, et al., "An Algorithm for Multisource Beamforming and Multitarget Tracking," IEEE Trans. on Signal Processing, vol. 44, No. 6, Jun. 1996, pp. 1512-1522.

Affes, et al., "Robust Adaptive Beamforming via LMS-Like Target Tracking," Proceedings of IEEE International Conference on Acoustics, Speech and Signal Processing, Apr. 1994, pp. IV-269-IV-272.

Ahonen, et al, "Directional Analysis of Sound Field with Linear Microphone Array and Applications in Sound Reproduction," Audio Engineering Socity, Convention Paper 7329, May 2008, 11 pp.

Alarifi, et al., "Ultra Wideband Indoor Positioning Technologies: Analysis and Recent Advances," Sensors 2016, vol. 16, No. 707, 36 pp.

Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr12?dchild=1&keywords=drop+ceiling+return+air+grille&qid=1585862723&s=hi&sr=1-2>, 11 pp.

Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.

Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.

Armstrong Woodworks Concealed Catalog available at <https://sweets.construction.com/swts_content_files/3824/442581.pdf>, 2014, 6 pp.

Armstrong Woodworks Walls Catalog available at <https://www.armstrongceilings.com/pdbupimagesclg/220600.pdf/download/datasheet-woodworks-walls.pdf>, 2019, 2 pp.

Armstrong World Industries, Inc., I-Ceilings Sound Systems Speaker Panels, 2002, 4 pgs.

Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.

Armstrong, Ceiling Systems, Brochure page for Armstrong Softlook, 1995, 2 pp.

Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.

Armstrong, i-Ceilings, Brochure, 2009, 12 pp.

Arnold, et al., "A Directional Acoustic Array Using Silicon Micromachined Piezoresistive Microphones," Journal of the Acoustical Society of America, 113(1), Jan. 2003, 10 pp.

Atlas Sound, I128SYSM IP Compliant Loudspeaker System with Microphone Data Sheet, 2009, 2 pgs.

Atlas Sound, 1'X2' IP Speaker with Micophone for Suspended Ceiling Systems, https://www.atlasied.com/i128sysm, retrieved Oct. 25, 2017, 5 pgs.

Audio Technica, ES945 Omnidirectional Condenser Boundary Microphones, https://eu.audio-technica.com/resources/ES945%20Specifications.pdf, 2007, 1 pg.

(56) References Cited

OTHER PUBLICATIONS

Audix Microphones, Audix Introduces Innovative Ceiling Mics, http://audixusa.com/docs_12/latest_news/EFplFkAAkIOtSdolke. shtml, Jun. 2011, 6 pgs.

Audix Microphones, M70 Flush Mount Ceiling Mic, May 2016, 2 pgs.

Automixer Gated, Information Sheet, MIT, Nov. 2019, 9 pp.

AVNetwork, "Top Five Conference Room Mic Myths," Feb. 25, 2015, 14 pp.

Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.

Benesty, et al., "A New Class of Doubletalk Detectors Based on Cross-Correlation," IEEE Transactions on Speech and Audio Processing, vol. 8, No. 2, Mar. 2000, pp. 168-172.

Benesty, et al., "Adaptive Algorithms for Mimo Acoustic Echo Cancellation," AI2 Allen Institute for Artifical Intelligence, 2003. 30 pages.

Benesty, et al., "Differential Beamforming," Fundamentals of Signal Enhancement and Array Signal Processing, First Edition, 2017, 39 pp.

Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.

Benesty, et al., "Microphone Array Signal Processing," Springer, 2010, 20 pp.

Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.

Beyer Dynamic, Classis BM 32-33-34 DE-EN-FR 2016, 1 pg.

Beyer Dynamic, Classis-BM-33-PZ A1, 2013, 1 pg.

BNO055, Intelligent 9-axis absolute orientation sensor, Data sheet, Bosch, Nov. 2020, 118 pp.

Boyd, et al., Convex Optimization, Mar. 15, 1999, 216 pgs.

Brandstein, et al., "Microphone Arrays: Signal Processing Techniques and Applications," Digital Signal Processing, Springer-Verlag Berlin Heidelberg, 2001, 401 pgs.

Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.

Bruel & Kjaer, by J.J. Christensen and J. Hald, Technical Review: Beamforming, No. 1, 2004, 54 pgs.

BSS Audio, Soundweb London Application Guides, 2010, 120 pgs.

Buchner, et al., "An Acoustic Human-Machine Interface with Multi-Channel Sound Reproduction," IEEE Fourth Workshop on Multimedia Signal Processing, Oct. 2001, pp. 359-364.

Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.

Buchner, et al., "Full-Duplex Communication Systems Using Loudspeaker Arrays and Microphone Arrays," IEEE International Conference on Multimedia and Expo, Aug. 2002, pp. 509-512.

Buchner, et al., "Generalized Multichannel Frequency-Domain Adaptive Filtering: Efficient Realization and Application to Hands-Free Speech Communication," Signal Processing 85, 2005, pp. 549-570.

Buchner, et al., "Multichannel Frequency-Domain Adaptive Filtering with Application to Multichannel Acoustic Echo Cancellation," Adaptive Signal Processing, 2003, pp. 95-128.

Buck, "Aspects of First-Order Differential Microphone Arrays in the Presence of Sensor Imperfections," Transactions on Emerging Telecommunications Technologies, 13.2, 2002, 8 pp.

Buck, et al., "First Order Differential Microphone Arrays for Automotive Applications," 7th International Workshop on Acoustic Echo and Noise Control, Darmstadt University of Technology, Sep. 10-13, 2001, 4 pp.

* cited by examiner

400

402 — Receive Microphone Signal and Remote Audio Signal

404 — Detect Whether Doubletalk Condition is Present

406 — Doubletalk Condition Detected?

Yes

No

408 — Override NLP Gains for Subbands without Doubletalk Condition

410 — Select Compressed Gain-Corrected Remote Audio Signal for Loudspeaker Output 412 — Select Passthrough Remote Audio Signal for Loudspeaker Output

410

402 — Receive Microphone Signal and Remote Audio Signal

602 — Compress Remote Audio Signal as Function of Near End Signal Energy

604 — Apply Makeup Gain to Generate Compressed Gain-Corrected Remote Audio Signal

WIDEBAND DOUBLETALK DETECTION FOR OPTIMIZATION OF ACOUSTIC ECHO CANCELLATION

CROSS-REFERENCE TO RELATED APPLICATION

This application claims priority to U.S. Provisional Application Ser. No. 63/377,451, filed on Sep. 28, 2022, which is incorporated herein by reference in its entirety.

TECHNICAL FIELD

This application generally relates to acoustic echo cancellation. In particular, this application relates to utilizing the detection of doubletalk conditions to refine and optimize the operation of a non-linear processor used for acoustic echo cancellation.

BACKGROUND

Conferencing environments, such as boardrooms, conferencing settings, and the like, can involve the use of microphones (including microphone arrays) for capturing sound from audio sources and loudspeakers for presenting audio from a remote location (also known as a far end). For example, persons in a conference room may be conducting a conference call with persons at a remote location. Typically, speech and sound from the conference room may be captured by microphones and transmitted to the remote location, while speech and sound from the remote location may be received and played on loudspeakers in the conference room. The captured sound may also be disseminated to a local audience in the environment through amplified speakers for sound reinforcement. Multiple microphones may be used in order to optimally capture the speech and sound in the conference room.

However, the microphones may pick up the speech and sound from the remote location that is played on the loudspeakers. In this situation, the audio transmitted to the remote location may therefore include an echo, e.g., the speech and sound from the conference room as well as the speech and sound from the remote location. If there is no correction, the audio transmitted to the remote location may be low quality or unacceptable because of this echo. In particular, it would not be desirable for persons at the remote location to hear their own speech and sound.

Acoustic echo cancellation (AEC) systems may be able to remove such echo that is picked up by the microphone before the audio is transmitted to the remote location. However, an AEC system may work poorly and have suboptimal performance if it needs to constantly readapt and/or is overwhelmed, such as when the sound from a physically proximate loudspeaker is detected by the microphone. A non-linear processor in an AEC system is typically utilized to remove residual echo that cannot be removed by an adaptive filter, and to ultimately generate an echo-cancelled audio signal that is transmitted to the far end.

However, when periods of doubletalk occur (e.g., the microphone simultaneously detecting speaking in the room and speaking from the remote location that is playing on the loudspeaker), typical non-linear processors and AEC systems may have difficulty in transmitting high quality speech and sound from the local near end environment to the remote far end location. It may be particularly challenging to transmit high quality near end speech and sound when the microphones and loudspeaker are close to one another (e.g., when they are in the same device and/or housing) due to the energy of the far end audio played on the loudspeaker often being much greater than the energy of the near end audio being detected by the microphone. For example, non-linear processors in typical AEC systems may fully suppress residual echo when there is a doubletalk condition, which can cause the unintended attenuation of desired sound (e.g., near end voice). Furthermore, when the microphones and loudspeaker are close to one another, mechanical vibrations may be introduced by the microphones, the loudspeaker, and/or the housing. Such vibrations may have an excessive influence on the non-linearities introduced in the microphone signal. Since these non-linearities would not be included in the reference signal (e.g., the far end audio), the non-linearities may be perceived as near-end voice.

SUMMARY

The techniques of this disclosure are directed to solving the above-noted problems by providing systems and methods that are designed to, among other things: (1) allow certain subbands of an echo-cancelled signal to be transmitted by overriding certain gains of the subbands of the echo-cancelled audio signal in a non-linear processor, based on whether a doubletalk condition is detected; (2) compress a remote far end audio signal to reduce its dynamic range in certain bands and limit its volume when it is played on a loudspeaker, based on whether a doubletalk condition is detected; and (3) apply makeup gain to a compressed remote audio signal to minimize fluctuations in the remote audio played on the loudspeaker, based on whether a doubletalk condition is detected.

In an embodiment, a device may include at least one processor that is configured to determine one or more gains of one or more subbands of an initial echo-cancelled audio signal, determine that a doubletalk condition is present in one or more subbands of a microphone signal and a remote audio signal, and when the doubletalk condition is determined to be present: override the one or more gains of the one or more subbands of the initial echo-cancelled audio signal to generate a final echo-cancelled audio signal, transmit the final echo-cancelled audio signal to a remote location, compress the remote audio signal to generate a compressed remote audio signal, and play the compressed remote audio signal on a loudspeaker. The initial echo-cancelled audio signal may be generated based on the microphone signal and the remote audio signal.

In another embodiment, a system may include a microphone configured to generate a microphone signal, a loudspeaker configured to generate sound based on a remote audio signal, and at least one processor. The microphone and the loudspeaker may be located in the same housing. The at least one processor may be configured to determine that a doubletalk condition is present in the microphone signal and the remote audio signal, and when the doubletalk condition is determined to be present: override one or more gains of one or more subbands of an initial echo-cancelled audio signal to generate a final echo-cancelled audio signal, and compress the remote audio signal to generate a compressed remote audio signal for output on the loudspeaker. The initial echo-cancelled audio signal may be generated based on the microphone signal and the remote audio signal.

In a further embodiment, a device may include at least one processor configured to determine that a doubletalk condition is present based on a microphone signal and a remote audio signal, and when the doubletalk condition is determined to be present: override one or more gains of one or more subbands of an initial echo-cancelled audio signal to generate a final echo-cancelled audio signal, and compress the remote audio signal to generate a compressed remote audio signal. The initial echo-cancelled audio signal may be generated based on the microphone signal and the remote audio signal.

In another embodiment, a device may include at least one processor configured to determine that a doubletalk condition is present based on a microphone signal and a remote audio signal, and when the doubletalk condition is determined to be present: override one or more gains of one or more subbands of an initial echo-cancelled audio signal to generate a final echo-cancelled audio signal, wherein the initial echo-cancelled audio signal is generated based on the microphone signal and the remote audio signal. The final echo-cancelled audio signal may be transmitted to a remote location. The initial echo-cancelled audio signal may be generated based on the microphone signal and the remote audio signal.

In a further embodiment, a device may include at least one processor configured to the doubletalk condition is determined to be present based on a microphone signal and a remote audio signal, and when the doubletalk condition is determined to be present: compress the remote audio signal to generate a compressed remote audio signal, and play the compressed remote audio signal on a loudspeaker.

In another embodiment, a method includes determining that a doubletalk condition is present in one or more subbands of a microphone signal and a remote audio signal, and when the doubletalk condition is determined to be present: overriding one or more gains of one or more subbands of an initial echo-cancelled audio signal to generate a final echo-cancelled audio signal, transmitting the final echo-cancelled audio signal to a remote location, compressing the remote audio signal to generate a compressed remote audio signal, and playing the compressed remote audio signal on a loudspeaker. The initial echo-cancelled audio signal may be generated based on the microphone signal and the remote audio signal.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
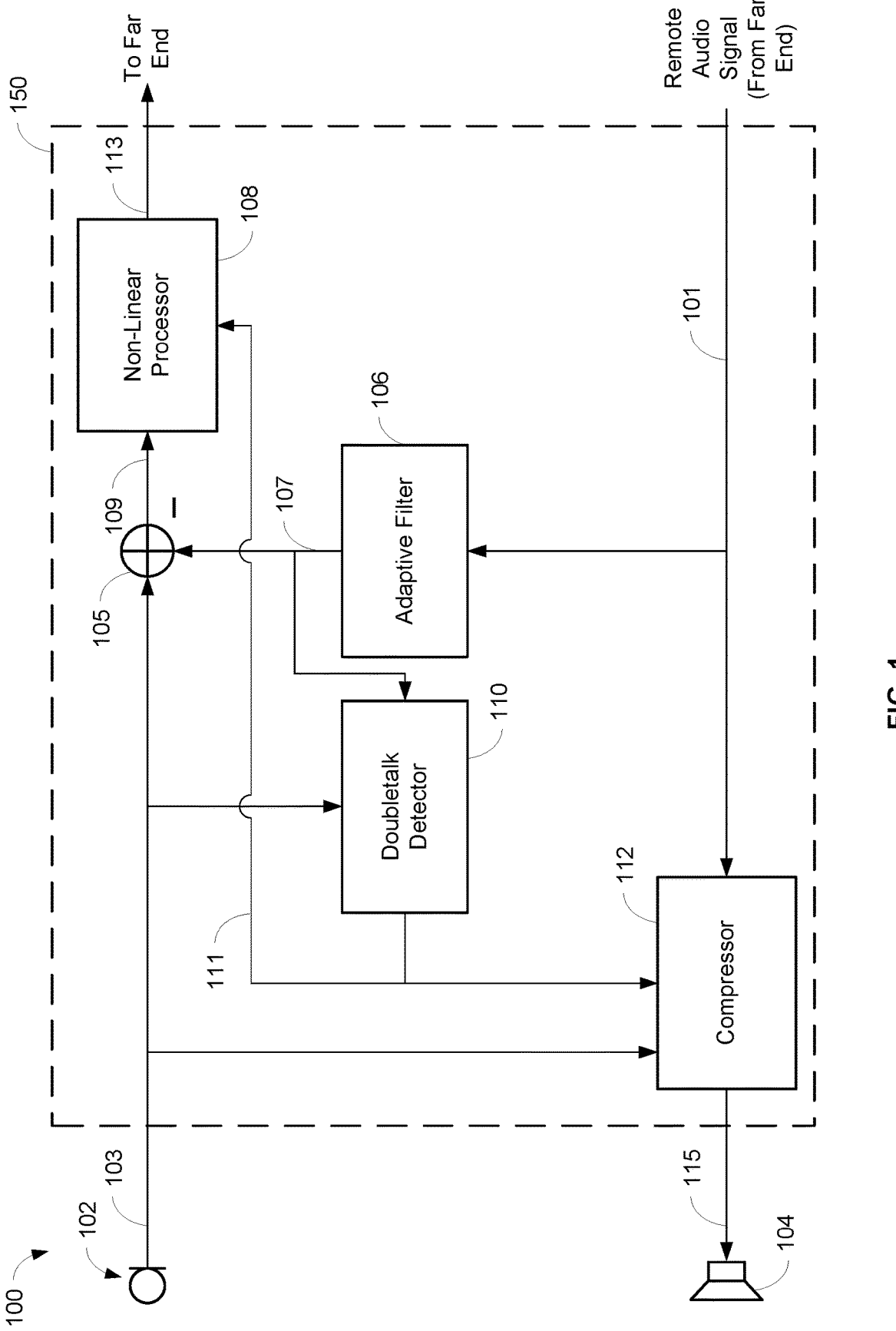
FIG. 1 is a schematic diagram of a communication system including an acoustic echo cancellation system that includes a non-linear processor, a doubletalk detector, and a compressor, in accordance with some embodiments.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The systems and methods described herein can override the operation of a non-linear processor in an acoustic echo cancellation (AEC) system when a doubletalk condition is present by modifying the gains of the non-linear processor such that certain frequency bands of an initial echo-cancelled audio signal are less attenuated for transmission from the near end to the far end. The frequency bands with modified gains may be those that contain desired sound, such as near end speech. Likewise, other frequency bands of the initial echo-cancelled audio signal (e.g., that contain undesired sound) may still be attenuated by the non-linear processor. The resulting final echo-cancelled signal generated by a non-linear processor utilizing these systems and methods may therefore have a higher quality by including more desired sound in the audio that is played at the far end and/or at the near end (e.g., for sound reinforcement). In embodiments, a non-linear processor may be known as an echo suppressor.

A doubletalk condition may include when the microphone simultaneously detects speech in the room and speech from the remote location that is playing on the loudspeaker, for example. The systems and methods described herein may determine that there is a doubletalk condition when desired sound is detected in certain frequency bands on a microphone signal and a remote audio signal even while undesired sound is also detected in those frequency bands, and where the number of frequency bands with a doubletalk condition meet a criteria. In this situation, it can be assumed that desired sound may be present in the near end audio in all frequency bands of the initial echo-cancelled audio signal, and therefore that the gains of the non-linear processor for frequency bands without a doubletalk condition can be modified to reduce the attenuation of these frequency bands.

In the frequency bands that do not have a doubletalk condition, desired sound is presumed to be present because the energy of the near end audio being detected by the microphone is greater than the energy of the far end audio played on the loudspeaker. However, the gains of the non-linear processor for frequency bands that have a doubletalk condition may be left unmodified because the energy of the far end audio being played on the loudspeaker is greater than the energy of the near end audio being detected by the microphone.

Other systems and methods described herein can, when a doubletalk condition is present, compress the remote audio signal from the far end that is typically being played on a loudspeaker at the near end. Compressing the remote audio signal can reduce its dynamic range and lower its volume in order to reduce the energy of the remote audio signal relative to the energy of near end audio, as well as reduce artifacts of the mechanical housing due to resonance at certain frequencies. Performing such a compression of the remote audio signal may improve the physical characteristics of the audio device and subsequently the operation of the non-linear processor in the AEC system when a doubletalk condition is present by reducing the potential attenuation of desired sound detected by the microphone. Further systems and methods described herein can also apply makeup gain to the compressed remote audio signal when a doubletalk condition is present in order to minimize fluctuations when the remote audio signal is played on the loudspeaker to have a more consistent audio level.

Through use of these systems and methods, the operation of an audio device may be optimized by improving the quality of the audio from a near end when a doubletalk condition is present. For example, even in situations when there is a doubletalk condition, at least some speech from the near end may be transmitted to a far end so that the far end participants are still able to hear the near end participants. Such speech from the near end may also be used for local sound reinforcement. Audio devices where a microphone and a loudspeaker are in close proximity to one another, e.g., in the same housing, may particularly benefit from these systems and methods. The occurrence of the undesirable echo of persons at a remote location hearing their own speech and sound can be reduced using these systems and methods when there is a doubletalk condition, while enabling more of the speech and sound from the near end to be transmitted to the remote location. The higher audio quality of the audio device may result in greater user satisfaction at both the near end and the far end when there is a doubletalk condition.

FIG. 1 is a schematic diagram of a communication system 100 for capturing sound from audio sources in an environment using a microphone 102 and presenting audio from a remote location using a loudspeaker 104. The communication system 100 may include an acoustic echo cancellation system 150 that includes an adaptive filter 106, a non-linear processor 108, a doubletalk detector 110, and a compressor 112. When a doubletalk condition is detected by the doubletalk detector 110, the gains of the non-linear processor 108 can be modified in certain frequency bands of an initial echo-cancelled audio signal 109 in order to allow desired sound in these frequency bands to be less attenuated for transmission to the far end. Furthermore, the compressor 112 can compress and apply makeup gain to the remote audio signal 101 when a doubletalk condition is detected by the doubletalk detector 110. These and other embodiments can improve the overall operation of the acoustic echo cancellation system 150, and are described in more detail below.

The communication system 100 may generate an echo-cancelled audio signal 113 using the acoustic echo cancellation system 150. The echo-cancelled audio signal 113 may mitigate the sound received from the remote location that is played on the loudspeaker 104, and in particular, mitigate linear echo and residual echo that is sensed by the microphone 102. In this way, the echo-cancelled audio signal 113 may be transmitted to the remote location without the undesirable echo of persons at the remote location hearing their own speech and sound.

Environments such as conference rooms may utilize the communication system 100 to facilitate communication with persons at the remote location, for example. The type of microphone 102 and its placement in a particular environment may depend on the locations of audio sources, physical space requirements, aesthetics, room layout, and/or other considerations. For example, in some environments, the microphone 102 may be placed on a table or lectern near the audio source. In other environments, the microphone 102 may be mounted overhead to capture the sound from the entire room, for example. The communication system 100 may work in conjunction with any type and any number of microphones 102, including array microphones. The microphone 102 and the loudspeaker 104 may be located in the same housing, in some embodiments, or may be in separate housings, in other embodiments.

Various components included in the communication system 100 may be implemented using software executable by one or more servers or computers, such as a computing device with a processor and memory, and/or by hardware (e.g., discrete logic circuits, application specific integrated circuits (ASIC), programmable gate arrays (PGA), field programmable gate arrays (FPGA), etc. In general, a computer program product in accordance with the embodiments includes a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the methods described herein. In this regard, the program code may be implemented in any desired language, and may be implemented as machine code, assembly code, byte code, interpretable source code or the like (e.g., via C, C++, Java, ActionScript, Python, Objective-C, JavaScript, CSS, XML, and/or others).

In FIG. 1, the microphone 102 may detect sound in the local near end environment and convert the sound to an audio signal 103. In embodiments, the microphone 102 may include multiple microphone elements that generate multiple audio signals 103 that can be processed by a beamformer (not shown) to generate one or more beamformed audio signals. Accordingly, while the systems and methods are described herein as using an audio signal 103 from microphone 102, it is contemplated that the systems and methods may also utilize any type of acoustic source, such as beamformed audio signals generated by a beamformer. In addition or alternatively, the audio signal 103 from the microphone 102 and the remote audio signal 101 may be converted into the frequency domain, in which case, the acoustic echo cancellation system 150 can operate in the frequency domain.

The adaptive filter 106 may process the remote audio signal 101 to generate a filtered remote audio signal 107 that is an estimate of the acoustic path of the remote audio signal 101, e.g., a model of the echo that will be detected by the microphone 102. In embodiments, the adaptive filter 106 may be a finite impulse response filter. The filtered remote audio signal 107 generated by the adaptive filter 106 may be subtracted from the audio signal 103 of the microphone 102 at the summing point 105 to generate an initial echo-cancelled audio signal 109. Linear echo in the microphone audio signal 103 may be suppressed in the initial echo-cancelled audio signal 109.

Figure 4:
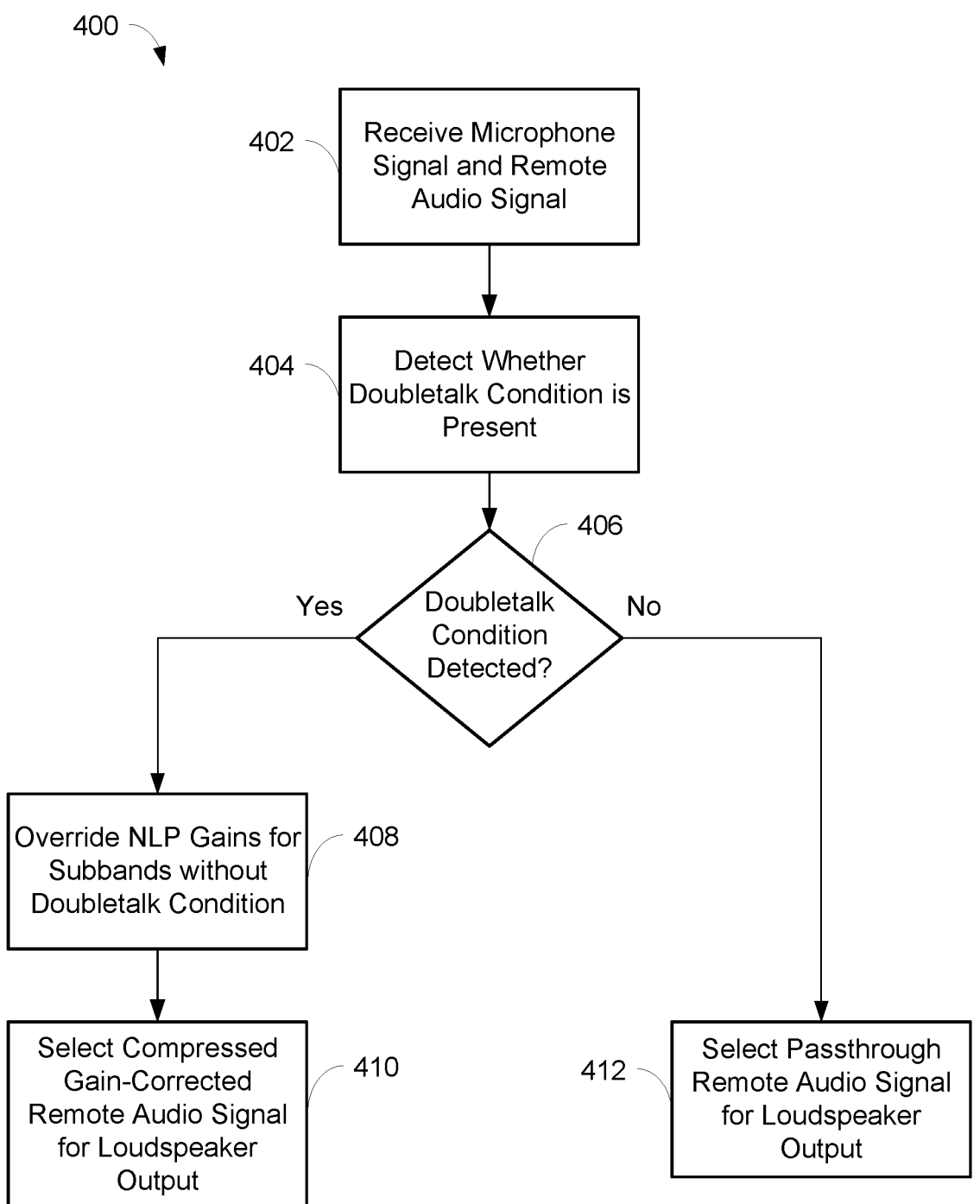
FIG. 4 is a flowchart illustrating operations of the communication system of FIG. 1 based on the presence of a doubletalk condition, in accordance with some embodiments.
Figure 5:
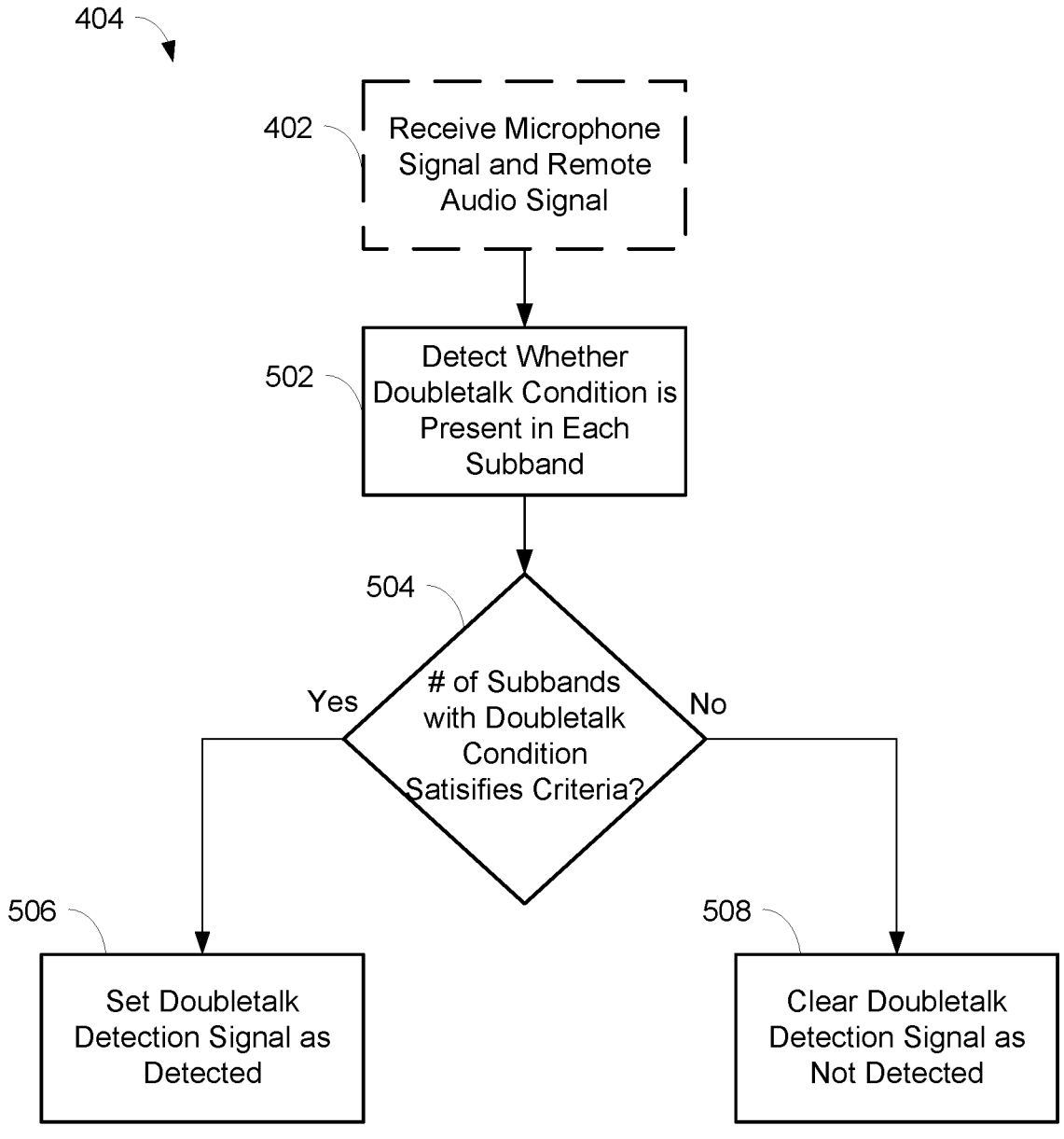
FIG. 5 is a flowchart illustrating operations of the doubletalk detector in the acoustic echo cancellation system of FIG. 1, in accordance with some embodiments.
Figure 6:
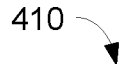
FIG. 6 is a flowchart illustrating operations of the compressor in the acoustic echo cancellation system of FIG. 1, in accordance with some embodiments.
Figure 6:
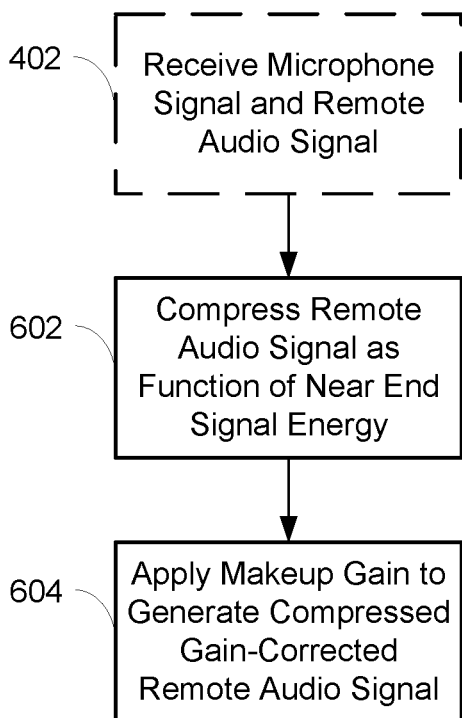

FIGS. 4-6 illustrate exemplary methods for utilizing the communication system 100 and the acoustic echo cancellation system 150. In particular, FIG. 4 illustrates a method 400 for operating the acoustic echo cancellation system 150 based on whether a doubletalk condition is present, FIG. 5 illustrates a method 404 for determining whether a doubletalk condition is present using the doubletalk detector 110, and FIG. 6 illustrates a method 410 for operating the compressor 112 when a doubletalk condition is present. Each of these processes is described in more detail below. One or more processors and/or other processing components (e.g., analog to digital converters, encryption chips, etc.) within or external to the communication system 100 may perform any, some, or all of the steps of the methods 400, 404, and/or 410. One or more other types of components (e.g., memory, input and/or output devices, transmitters, receivers, buffers, drivers, discrete components, etc.) may also be utilized in conjunction with the processors and/or other processing components to perform any, some, or all of the steps of the methods.

As shown in the method 400 of FIG. 4, at step 402, the acoustic echo cancellation system 150 may receive an audio signal 103 from the microphone 102, as well as a remote audio signal 101. The microphone audio signal 103 may typically include sound in the near end environment, such as speech from local participants, while the remote audio signal 101 may typically include sound from the far end environment, such as speech from remote participants. At step 404, the doubletalk detector 110 may determine that a doubletalk condition is present, based on the microphone audio signal 103 and the remote audio signal 101. The doubletalk detector 110 may determine whether there is a doubletalk condition in each of the subbands of the microphone audio signal 103 and the remote audio signal 101, and also determine whether an overall doubletalk condition is present based on the number of subbands that have a doubletalk condition. When an overall doubletalk condition has been detected at step 404, the doubletalk detector 110 may determine that a doubletalk condition is present such as by setting a doubletalk detection signal 111 to denote that there is an overall doubletalk condition, in some embodiments. Conversely, when an overall doubletalk condition has not been detected at step 404, the doubletalk detector 110 may determine that a doubletalk condition is not present such as by clearing the doubletalk detection signal 111 to denote that there is not an overall doubletalk condition, in some embodiments. In other embodiments, other suitable signals may be utilized to denote whether there is an overall doubletalk condition at step 404.

Figure 2:
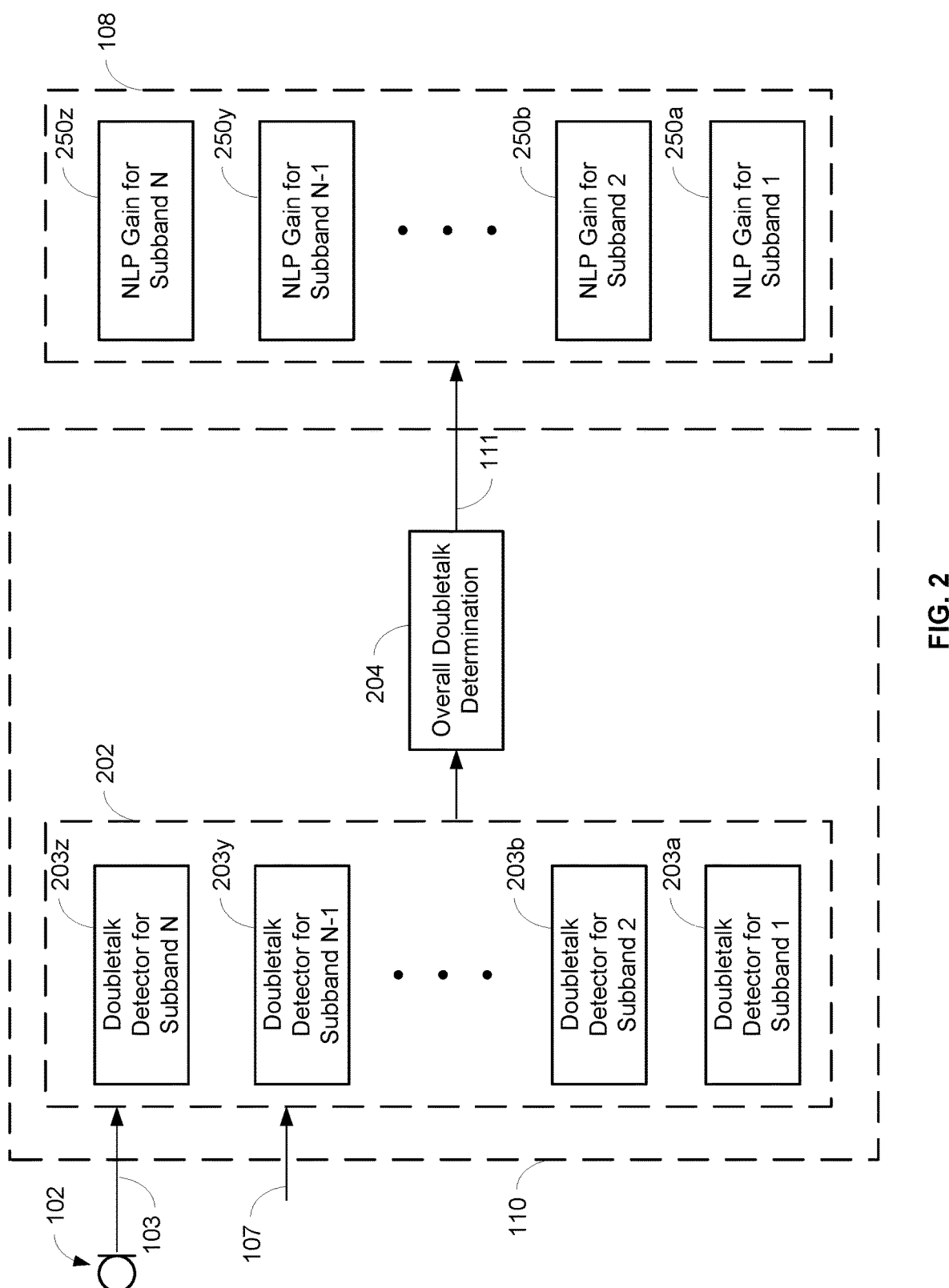
FIG. 2 is a schematic diagram of portions of the doubletalk detector and the non-linear processor in the acoustic echo cancellation system of FIG. 1, in accordance with some embodiments.

FIG. 5 shows an embodiment of a method 404 for detecting whether an overall doubletalk condition is present. The method 404 shown in FIG. 5 may correspond to step 404 of the method 400 shown in FIG. 4. In the method 404 of FIG. 5, the doubletalk detector 110 may determine whether each subband of the microphone audio signal 103 and the remote audio signal 101 received at step 402 has a doubletalk condition, such as at step 502. FIG. 2 shows an exemplary embodiment of portions of the doubletalk detector 110 as well as the non-linear processor 108. In particular, subband doubletalk detectors 203a, b, . . . , y, z corresponding to each of any number of subbands of the microphone audio signal 103 and a filtered remote audio signal 107 (which is based on the remote audio signal 101) may determine whether there is a doubletalk condition in each specific subband at step 502.

In embodiments, each of the subband doubletalk detectors 203a, b, . . . , y, z may detect a doubletalk condition by comparing, for a particular subband, the microphone audio signal 103 to a filtered remote audio signal 107 from the adaptive filter 106. The filtered remote audio signal 107 may be an estimate of the acoustic path of the remote audio signal 101. Accordingly, a doubletalk condition for a particular subband can be detected by the subband doubletalk detectors 203a, b, . . . , y, z when the level of the microphone audio signal 103 is higher than the filtered remote audio signal 107 by a threshold amount. There may be any suitable number of subband doubletalk detectors 203a, b, . . . , y, z. For example, in one embodiment, there may be fourteen subbands over a frequency range of 0-5 kHz, along with corresponding subband doubletalk detectors 203a, b, . . . , y, z.

At step 504, the number of subbands that have a doubletalk condition present may be compared to a doubletalk condition criteria, such as by the overall doubletalk determination unit 204. In embodiments, the doubletalk condition criteria may be a numerical range, a percentage range, a numerical threshold, or a percentage threshold of the number of subbands that have a doubletalk condition present. For example, an overall doubletalk condition may be determined to be present by the overall doubletalk determination unit 204 if the number of subbands that have a doubletalk condition exceeds a certain minimum number but is less than a certain maximum number. As another example, an overall doubletalk condition may be determined to be present by the overall doubletalk determination unit 204 if 30% of the number of subbands has a doubletalk condition (e.g., five out of fourteen subbands).

If the number of subbands that have a doubletalk condition present satisfies the doubletalk condition criteria at step 504 ("YES" branch of step 504), then the method 404 may continue to step 506. At step 506, the overall doubletalk determination unit 204 may set the doubletalk detection signal 111 to denote that there is an overall doubletalk condition involving the microphone audio signal 103 and the remote audio signal 101. However, if the number of subbands that have a doubletalk condition present does not satisfy the doubletalk condition criteria at step 504 ("NO" branch of step 504), then the method 404 may continue to step 508. At step 508, the overall doubletalk determination unit 204 may clear the doubletalk detection signal 111 to denote that there is not an overall doubletalk condition involving the microphone audio signal 103 and the remote audio signal 101.

Returning to the method 400 of FIG. 4, at step 406, if a doubletalk condition has been detected at step 404 ("YES" branch of step 406), e.g., by the doubletalk detection signal 111 being set by the doubletalk detector 110, then the method 400 may continue to step 408. At step 408, the gains in the non-linear processor 108 for particular subbands of the initial echo-cancelled audio signal 109 may be overridden and modified. Prior to step 408 and/or prior to the method 400, the overridden gains may have been initially generated by the non-linear processor 108 for the particular subbands of the initial echo-cancelled audio signal 109. In embodiments, the particular subbands with gains in the non-linear processor 108 that may be modified at step 408 may include the subbands that do not have a doubletalk condition present. For example, the gains of these particular subbands that do not have a doubletalk condition present may be increased such that their attenuation by the non-linear processor 108 is reduced. This can result in more desired sound (e.g., near end voice) being included by the non-linear processor 108 in the final echo-cancelled audio signal 113, since the energy of the near end audio is greater than the energy of the far end audio in these particular subbands that do not have a doubletalk condition present. Moreover, these particular subbands that do not have a doubletalk condition present will likely include fundamental speech frequencies that are more pertinent for intelligibility. In embodiments, the final echo-cancelled audio signal 113 may be transmitted to the far end remote location and/or utilized for local sound reinforcement.

As depicted in FIG. 2, the gains 250*a, b, . . . , y, z* for particular subbands may be modified in the non-linear processor 108, dependent on whether there is an overall doubletalk condition and whether a particular subband does or does not have a doubletalk condition present. In one example, when the doubletalk detection signal 111 denotes that there is an overall doubletalk condition, a doubletalk condition has not been detected in subbands 1 and 2 by respective subband doubletalk detectors 203*a* and 203*b*, while a doubletalk condition has been detected in other subbands (e.g., N and N−1) by their respective subband doubletalk detectors 203. In this example, the gains 250*a* and 250*b* for subbands 1 and 2 may be overridden and modified in the non-linear processor 108 while the other gains 250 are left unmodified in the non-linear processor 108.

Figure 3:
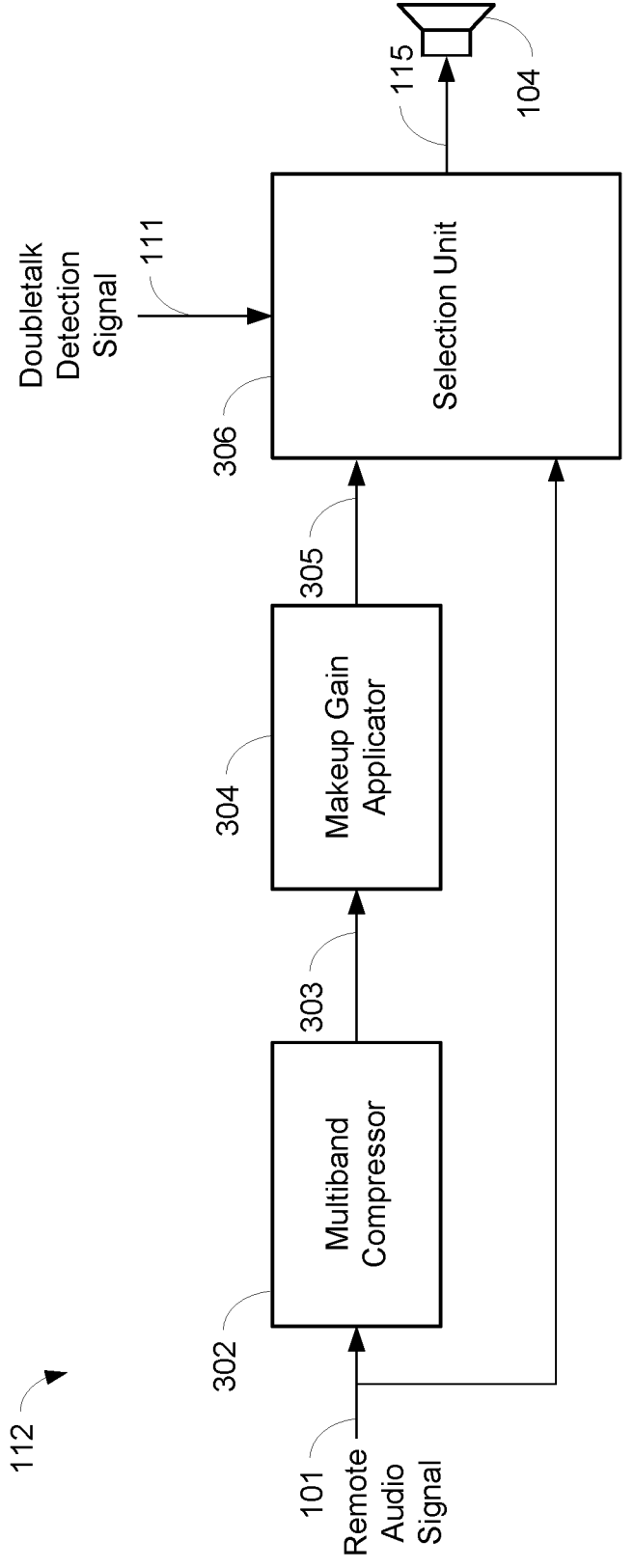
FIG. 3 is a schematic diagram of the multiband compressor in in the acoustic echo cancellation system of FIG. 1, in accordance with some embodiments.

Returning to FIG. 4, after step 408, the method 400 may continue to step 410 to select a compressed gain-corrected remote audio signal 305 for output on the loudspeaker 104. As described in more detail below with respect to FIGS. 3 and 6, the remote audio signal 101 may be processed by the compressor 112 to reduce its dynamic range and lower its volume, as well as to have makeup gain applied. The compressed gain-corrected remote audio signal 305 generated by the compressor 112 can be played on the loudspeaker 104 as output audio signal 115 instead of the remote audio signal 101.

Returning to step 406, if a doubletalk condition has not been detected at step 404 ("NO" branch of step 406), e.g., by the doubletalk detection signal 111 being cleared by the doubletalk detector 110, then the method 400 may continue to step 412. At step 412, the remote audio signal 101 may be selected to be played as the output audio signal 115 on the loudspeaker 104. It should be noted that when a doubletalk condition has not been detected at step 404, the operation of the non-linear processor 108 is not overridden and the initially generated gains of the non-linear processor 108 are not modified.

FIG. 6 shows an embodiment of a method 410 for compressing and applying makeup gain to the remote audio signal 101 when a doubletalk condition has been detected at step 406. The method 410 shown in FIG. 6 may correspond to step 410 of the method 400 shown in FIG. 4. In the method 410 of FIG. 6, the compressor 112 may compress the remote audio signal 101 at step 602 to reduce its dynamic range and lower its volume to generate a compressed remote audio signal 303, such as by using a multiband compressor 302 as shown in the exemplary embodiment in FIG. 3. In embodiments, the multiband compressor 302 may split the remote audio signal 101 into separate bands so that each band can be compressed independently, such as by compressing lower frequencies and preserving higher frequencies (or vice versa).

The multiband compressor 302 may compress the remote audio signal 101 at step 602 as a function of the energy of the microphone audio signal 103, in some embodiments. For example, the remote audio signal 101 may be more compressed when the energy of the microphone audio signal 103 is relatively high, and the remote audio signal 101 may be less compressed when the energy of the microphone audio signal 103 is relatively low and/or when there is no doubletalk condition detected. In other embodiments, the multiband compressor 302 may compress the remote audio signal 101 at step 602 by a constant amount.

The method 410 may continue to step 604 where a makeup gain applicator 304 may apply makeup gain to the compressed remote audio signal 303 and generate a compressed gain-corrected remote audio signal 305. Adding makeup gain to the compressed remote audio signal 303 can minimize fluctuations in the amplitude of the audio played on the loudspeaker 104 by amplifying the level of certain subbands of the compressed remote audio signal 303 to be more consistent with the level of other subbands of the compressed remote audio signal 303. The resulting compressed gain-corrected remote audio signal 305 may have a more even audio level and improve the audio heard by listeners of the loudspeaker 104.

As described previously, depending on whether a doubletalk condition has been detected at step 406, either the compressed gain-corrected remote audio signal 305 or the remote audio signal 101 may be selected at step 410 or step 412, respectively, to be played as the output audio signal 115 on the loudspeaker 104. In the compressor 112, a selection unit 306 may be utilized to select the compressed gain-corrected remote audio signal 305 or the remote audio signal 101 as the output audio signal 115, based on the state of the doubletalk detection signal 111. In particular, the compressed gain-corrected remote audio signal 305 may be selected as the output audio signal 115 when the doubletalk detection signal 111 is set (indicating that an overall doubletalk condition is present), and the remote audio signal 101 may be selected as the output audio signal 115 when the doubletalk detection signal 111 is cleared (indicating that an overall doubletalk condition is not present). The selection unit 306 may be a matrix mixer, in some embodiments. In other embodiments, the selection unit 306 may be a multiplexer or other suitable device. By selecting the compressed gain-corrected remote audio signal 305 as the output audio signal 115 when there is an overall doubletalk condition, the operation of the non-linear processor 108 may be optimized due to the improvement of the ratio of the energy of the near end audio to the energy of the remote audio. In some embodiments, the selection unit 306 may select the compressed remote audio signal 303 and/or the compressed gain-corrected remote audio signal 305 to be played as the output audio signal 115 on the loudspeaker 104 when no doubletalk condition is present.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

The description herein describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A device, comprising:
one or more processors configured to:
determine an initial echo-cancelled audio signal based on a microphone signal and a remote audio signal;
determine that a doubletalk condition is present in one or more first subbands of the initial echo-cancelled audio signal;
determine that a doubletalk condition is not present in one or more second subbands of the initial echo-cancelled audio signal;
override one or more gains of the one or more second subbands of the initial echo-cancelled audio signal to generate a final echo-cancelled audio signal; and
transmit the final echo-cancelled audio signal to a remote location.

2. The device of claim 1, wherein any of the one or more processors is configured to determine that the doubletalk condition is present by:
determining the one or more gains of the one or more first subbands of the initial echo-cancelled audio signal;
determining that a doubletalk condition is present in one or more subbands of the microphone signal and the remote audio signal; and determining that the doubletalk condition is present when the doubletalk condition is present in the one or more subbands of the microphone signal and the remote audio signal.

3. The device of claim 2, wherein any of the one or more processors is configured to determine that the doubletalk condition is present by:
determining that the doubletalk condition is present in each subband of the microphone signal and the remote audio signal;
based on a number of subbands having the doubletalk condition present satisfying a predetermined doubletalk condition criteria, determining that the doubletalk condition is present; and
based on the number of subbands having the doubletalk condition present not satisfying the predetermined doubletalk condition criteria, determining that the doubletalk condition is not present.

4. The device of claim 2, wherein any of the one or more processors is configured to determine that the doubletalk condition is present in the one or more subbands of the microphone signal and the remote audio signal based on a ratio of an energy of the microphone signal to an energy of the remote audio signal.

5. The device of claim 2, wherein any of the one or more processors is configured to override one or more gains of the one or more second subbands of the initial echo-cancelled audio signal by:
increasing, in a non-linear processor, the one or more gains of the one or more second subbands of the initial echo-cancelled audio signal that do not have presence of the doubletalk condition.

6. The device of claim 1, wherein any of the one or more processors is further configured to:
when the doubletalk condition is determined to be present:
compress the remote audio signal to generate a compressed remote audio signal; and
play the compressed remote audio signal on a loudspeaker.

7. The device of claim 6, wherein any of the one or more processors is configured to compress the remote audio signal by limiting a volume of one or more subbands of the remote audio signal.

8. The device of claim 6, wherein any of the one or more processors is configured to compress the remote audio signal by reducing a dynamic range of the remote audio signal.

9. The device of claim 6, wherein any of the one or more processors is further configured to, when the doubletalk condition is determined to be present, apply a makeup gain to the compressed remote audio signal to generate a compressed gain-corrected remote audio signal.

10. A method, comprising:
determining an initial echo-cancelled audio signal based on a microphone signal and a remote audio signal;
determining that a doubletalk condition is present in one or more first subbands of the initial echo-cancelled audio signal;
determining that a doubletalk condition is not present in one or more second subbands of the initial echo-cancelled audio signal;
overriding one or more gains of the one or more second subbands of the initial echo-cancelled audio signal to generate a final echo-cancelled audio signal; and
transmitting the final echo-cancelled audio signal to a remote location.

11. The method of claim 10, wherein determining that the doubletalk condition is present comprises:

determining the one or more gains of the one or more first subbands of the initial echo-cancelled audio signal;

determining that a doubletalk condition is present in one or more subbands of the microphone signal and the remote audio signal; and determining that the doubletalk condition is present when the doubletalk condition is present in the one or more subbands of the microphone signal and the remote audio signal.

12. The method of claim 11, wherein determining that the doubletalk condition is present comprises:

determining that the doubletalk condition is present in each subband of the microphone signal and the remote audio signal;

based on a number of subbands having the doubletalk condition present satisfying a predetermined doubletalk condition criteria, determining that the doubletalk condition is present; and based on the number of subbands having the doubletalk condition present not satisfying the predetermined doubletalk condition criteria, determining that the doubletalk condition is not present.

13. The method of claim 11, wherein determining that the doubletalk condition is present in the one or more subbands of the microphone signal and the remote audio signal is based on a ratio of an energy of the microphone signal to an energy of the remote audio signal.

14. The method of claim 11, wherein overriding the one or more gains of the one or more second subbands of the initial echo-cancelled audio signal comprises:

increasing, in a non-linear processor, the one or more gains of the one or more second subbands of the initial echo-cancelled audio signal that do not have presence of the doubletalk condition.

15. The method of claim 10, further comprising:

when the doubletalk condition is determined to be present:

compressing the remote audio signal to generate a compressed remote audio signal; and playing the compressed remote audio signal on a loudspeaker.

16. The method of claim 15, wherein compressing the remote audio signal comprises limiting a volume of one or more subbands of the remote audio signal.

17. The method of claim 15, wherein compressing the remote audio signal comprises reducing a dynamic range of the remote audio signal.

18. The method of claim 15, further comprising when the doubletalk condition is determined to be present, applying a makeup gain to the compressed remote audio signal to generate a compressed gain-corrected remote audio signal.

19. A system, comprising:

a microphone configured to generate a microphone signal;

a loudspeaker configured to generate sound based on a remote audio signal, wherein the microphone and the loudspeaker are located in a same housing; and one or more processors configured to:

determine an initial echo-cancelled audio signal based on a microphone signal and a remote audio signal;

determine that a doubletalk condition is present in one or more first subbands of the initial echo-cancelled audio signal; and determine that a doubletalk condition is not present in one or more second subbands of the initial echo-cancelled audio signal;

override one or more gains of the one or more second subbands of the initial echo-cancelled audio signal to generate a final echo-cancelled audio signal; and compress the remote audio signal based on an energy of the microphone signal to generate a compressed remote audio signal.

20. The system of claim 19, wherein any of the one or more processors is configured to override one or more gains of the one or more second subbands of the initial echo-cancelled audio signal by:

increasing, in a non-linear processor, the one or more gains of the one or more second subbands of the initial echo-cancelled audio signal that do not have presence of the doubletalk condition.

* * * * *